United States Patent
Bush et al.

(10) Patent No.: US 12,167,505 B2
(45) Date of Patent: Dec. 10, 2024

(54) SYSTEM TO MONITOR AND PROCESS RISK RELATIONSHIP SENSOR DATA

(71) Applicant: HARTFORD FIRE INSURANCE COMPANY, Hartford, CT (US)

(72) Inventors: Bret M. Bush, Austin, TX (US); Daniel L. Campany, Wethersfield, CT (US); Elvis C. Chidozie, Windsor, CT (US); Tobias Cushing, Glastonbury, CT (US); Alexander Scott Eshoo, Bloomfield, CT (US); Marie C. Norcia, Spencer, MA (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 18/480,775

(22) Filed: Oct. 4, 2023

(65) Prior Publication Data
US 2024/0032150 A1 Jan. 25, 2024

Related U.S. Application Data

(63) Continuation of application No. 17/333,458, filed on May 28, 2021, now Pat. No. 11,818,801.

(51) Int. Cl.
| | |
|---|---|
| *H04W 84/18* | (2009.01) |
| *G06V 20/13* | (2022.01) |
| *G16Y 40/10* | (2020.01) |
| *G16Y 40/35* | (2020.01) |
| *G16Y 40/50* | (2020.01) |

(52) U.S. Cl.
CPC ............ *H04W 84/18* (2013.01); *G06V 20/13* (2022.01); *G16Y 40/10* (2020.01); *G16Y 40/35* (2020.01); *G16Y 40/50* (2020.01)

(58) Field of Classification Search
CPC ....... H04W 84/18; G06V 20/13; G06V 20/52; G16Y 40/10; G16Y 40/35; G16Y 40/50
See application file for complete search history.

(56) References Cited

U.S. PATENT DOCUMENTS

| | | | |
|---|---|---|---|
| 11,818,801 B2* | 11/2023 | Bush | G06V 20/52 |
| 2019/0188797 A1* | 6/2019 | Przechocki | H04L 67/125 |
| 2020/0014816 A1* | 1/2020 | Speasl | H04N 1/00129 |
| 2024/0127385 A1* | 4/2024 | Megyese | G06F 16/2379 |

* cited by examiner

*Primary Examiner* — Jae Y Lee
(74) *Attorney, Agent, or Firm* — Buckley, Maschoff & Talwalkar LLC

(57) ABSTRACT

A plurality of risk relationship sensors, including at least one image capturing sensor (e.g., a camera), may each include an environment characteristic detection element, a power source, and a communication device to transmit data associated with risk relationship sensor data at a site. A risk relationship data store may contain electronic records associated with prior risk relationship events at other sites along with risk relationship sensor location data for those sites. An enterprise analytics platform may automatically analyze the electronic records in the risk relationship data store to create a predictive analytics algorithm. The data associated with potential risk relationship sensor data at the site may then be automatically analyzed, in substantially real-time, using the predictive analytics algorithm, and a result of the analysis may then be transmitted (e.g., to a party associated with the site).

23 Claims, 19 Drawing Sheets

SYSTEM TO MONITOR AND PROCESS RISK RELATIONSHIP SENSOR DATA

CROSS REFERENCE TO RELATED APPLICATION

This is a continuation of U.S. patent application Ser. No. 17/333,458, entitled "SYSTEM TO MONITOR AND PROCESS RISK RELATIONSHIP SENSOR DATA," filed May 28, 2021, the entire contents of which are incorporated herein by reference for all purposes.

FIELD

The present invention relates to computer systems and, more particularly, to computer systems associated with risk relationship sensor data analysis and characterization (e.g., associated with a construction site or retail store).

BACKGROUND

An enterprise may want to monitor and/or process risk relationship sensor data. For example, a general contractor might want to receive an alert message when a person is detected at a construction site (e.g., representing an increased risk of theft or vandalism damage during the weekend or at night when no workers are present). Similarly, an enterprise might want to be informed when a retail store regularly has more customers than expected, what area of the stores they seem to be visiting, etc. (representing an increased risk of slip and fall damage). Manually placing a risk relationship sensors based on an expert's knowledge and then interpreting data from those sensors, however, can be an expensive and error-prone process. For example, it might not be immediately obvious that an unexplained drop in temperature in one area of a construction site is being caused by a broken water pipe. Moreover, normal risk relationship sensor data patterns may vary considerably (e.g., substantially more foot traffic might normally be detected during the day as compared to an overnight period), making it difficult to set or program appropriate "thresholds" to trigger an alert message. As a result, improved ways to facilitate monitoring and/or processing of risk relationship sensor data may be desired.

SUMMARY

According to some embodiments, systems, methods, apparatus, computer program code and means may facilitate monitoring and/or processing of risk relationship sensor data. In some embodiments, A plurality of risk relationship sensors, including at least one image capturing sensor (e.g., a camera), may each include an environment characteristic detection element, a power source, and a communication device to transmit data associated with risk relationship sensor data at a site. A risk relationship data store may contain electronic records associated with prior risk relationship events at other sites along with risk relationship sensor location data for those sites. An enterprise analytics platform may automatically analyze the electronic records in the risk relationship data store to create a predictive analytics algorithm. The data associated with potential risk relationship sensor data at the site may then be automatically analyzed, in substantially real-time, using the predictive analytics algorithm, and a result of the analysis may then be transmitted (e.g., to a party associated with the site).

Some embodiments provide: means for collecting, from a plurality of risk relationship sensors, including at least one image capturing sensor, data associated with a risk relationship at the site via communication network, wherein each risk relationship sensor includes: (i) an environment characteristic detection element to sense an environment characteristic, (ii) a power source, and (iii) a communication device, coupled to the environment characteristic detection element and the power source, to transmit the data associated with a risk relationship; means for storing, in a risk relationship data store, electronic records associated with prior risk relationship events at other sites along with risk relationship sensor location data for those sites; means for automatically analyzing, by a computer processor of an enterprise analytics platform, the electronic records in the risk relationship data store to create a predictive analytics algorithm; means for automatically analyzing, by the computer processor of the enterprise analytics platform in substantially real-time, the data associated with a risk relationship at the site using the predictive analytics algorithm; and means for transmitting, from the enterprise analytics platform, an indication of a result of the analysis.

A technical effect of some embodiments of the invention is an improved, secure, and computerized method to facilitate monitoring and/or processing of risk relationship sensor data. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate monitoring and/or processing of risk relationship sensor data, predictive risk relationship sensor data modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of a risk relationship monitoring and/or processing by providing benefits in data accuracy, data availability, and data integrity, and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, forecast, and/or predicted via an analytics engine and results may then be analyzed efficiently to evaluate the potential for damage at a site, thus improving the overall performance of an enterprise system, including message storage requirements and/or bandwidth considerations (e.g., by reducing a number of messages that need to be transmitted via a communication network). Moreover, embodiments associated with predictive models might further improve predictions of contractor claims, resource allocation decisions, reduce errors in risk engineering and underwriting, etc.

Figure 1:
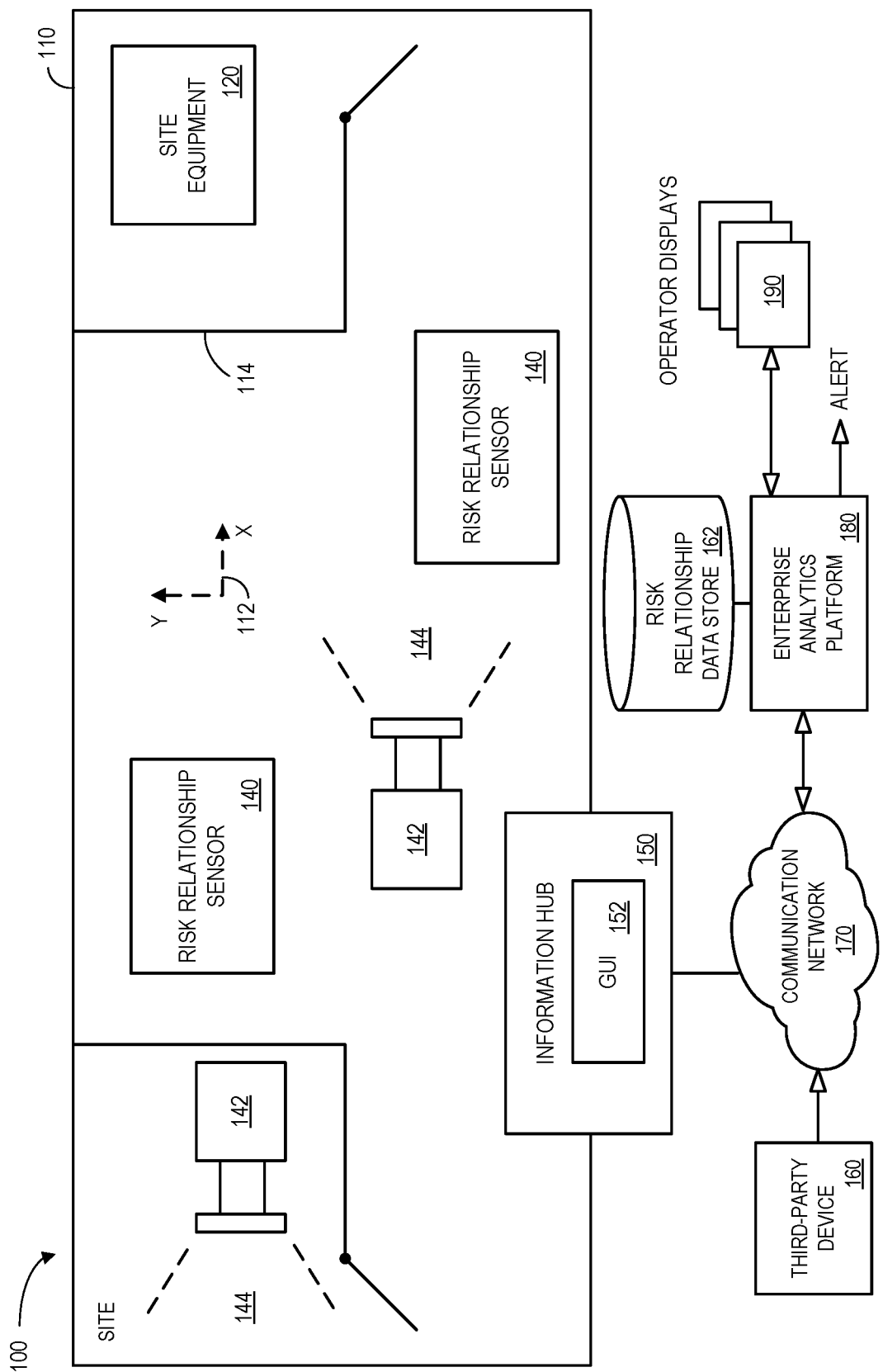
FIG. 1 is block diagram of a system according to some embodiments of the present invention.

An enterprise, such as an employer, may want to monitor and/or process risk relationship sensor data. Note that risk relationship losses can be substantial during a construction project. Damage may occur from unauthorized parties entering a building, improper use of equipment, worker injuries, etc. It can be difficult to monitor a site for these types of potential damage in an accurate and efficient manner. As a result, improved ways to facilitate monitoring and/or processing of risk relationship sensor data may be desired. FIG. 1 is block diagram of a system 100 associated with a site 110 where expensive site equipment 120 (e.g., electronic devices, communication systems, etc.) may be located according to some embodiments of the present invention. The site 110 might be associated with, for example, a construction or renovation project and may include windows, doors, interior walls 114, etc. In some embodiments, the system 100 includes a risk relationship information hub 150 that may receive information from a plurality of risk relationship sensors 140 (described with respect to FIG. 4), including at least one image capturing sensor 142 that captures image information with a field of view 144. Note that the site equipment 120, risk relationship sensors 140, image capturing sensors 142, etc. might be located at various locations within the site 110 (e.g., as indicated by axis 112) and/or be located on multiple floors of a building.

According to some embodiments, the risk relationship information hub 150 exchanges data with an enterprise analytics platform via communication network 170. For example, a Graphical User Interface ("GUI") 152 or other module of the risk relationship information hub 150 might transmit information via the Internet to facilitate a rendering of an interactive graphical operator interface display 190 and/or the creation of electronic alert messages, automatically created site recommendations, etc. According to some embodiments, the risk relationship information hub 150 may instead store this information in a local database. Note that the enterprise analytics platform 180 may also receive third-party data from a third-party device 160 (e.g., historical or current insurance claim or construction information).

The risk relationship information hub 150 and/or enterprise analytics platform 180 may receive a request for a display from a requestor device. For example, a general contractor might use his or her smartphone to submit the request to the risk relationship information hub 150. Responsive to the request, the risk relationship information hub 150 might access information from the enterprise analytics platform 180 (e.g., associated with a risk relationship sensor monitoring over a period of time). The risk relationship information hub 150 and/or enterprise analytics platform 180 may then use the GUI 152 to render operator displays 190. According to some embodiments, an operator may access secure site 110 information through a validation process that may include a user identifier, password, biometric information, device identifiers, geographic authentication processes, etc. According to some embodiments, the enterprise analytics platform 180 may further access electronic records from a risk relationship data store 162. The risk relationship impact store 162 might, for example, store information about prior risk relationship insurance claim results associated with other construction sites.

The risk relationship information hub 150 and/or enterprise analytics platform 180 might be, for example, associated with a Personal Computer ("PC"), laptop computer, smartphone, an enterprise server, a server farm, and/or a database or similar storage devices. The risk relationship information hub 150 and/or enterprise analytics platform 180 may, according to some embodiments, be associated with an insurance provider.

One function of the risk relationship information hub 150 may be to locally collect information from the risk relationship sensors 140 via a wireless Wi-Fi network and then forward that information (or a summary of the information) to the enterprise analytics platform 180 via the Internet or cellular data network. If the risk relationship sensors 140 can communicate directly with the enterprise analytics platform 180, a risk relationship information hub 150 might not be required. According to some embodiments, an "automated" enterprise analytics platform 180 may facilitate the provision of potential risk relationship information to an operator. For example, the risk relationship information hub 150 may automatically generate and transmit electronic alert messages (e.g., when a risk relationship event occurs) and/or site remediation recommendations (e.g., "damage to the fourth floor should be investigated immediately"). As used herein, the term "automated" may refer to, for example, actions that can be performed with little (or no) intervention by a human.

As used herein, devices, including those associated with the enterprise analytics platform 180 and any other device described herein may exchange information via any communication network 170 which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The risk relationship information hub 150 and/or enterprise analytics platform 180 may store information into and/or retrieve information from the risk relationship data store 162. The risk relationship data store 162 might be associated with, for example, a contractor, a building owner, a leasee, an insurance company, an underwriter, a risk engineer, or a claim analyst and might also store data associated with past and current insurance claims (e.g., damage loss claims). The risk relationship data store 162 may be locally stored or reside remote from the enterprise analytics platform 180. As will be described further below, the risk relationship data store 162 may be used by the enterprise analytics platform to generate and/or calculate risk relationship data (e.g., insurance premiums). Note that in some embodiments, the third-party device 160 may communicate directly with the risk relationship information hub 150 and/or enterprise analytics platform 180. According to some embodiments, the risk relationship information hub 150 communicates information associated with a simulator and/or a claims system to a remote operator and/or to an automated system, such as by transmitting an electronic file or template to an underwriter device, an insurance agent or analyst platform, an email server, a workflow management system, a predictive model, a map application, etc.

Although a single a risk relationship information hub 150 and enterprise analytics platform 180 is shown in FIG. 1, any number of such devices may be included. Moreover, various devices described herein might be combined according to embodiments of the present invention. For example, in some embodiments, the risk relationship information hub 150, enterprise analytics platform 180, and/or third-party device 160 might be co-located and/or may comprise a single apparatus.

Thus, some embodiments may provide a system 100 associated with the site 110, including the plurality of risk relationship sensors 140 and the at least one image capturing sensor 142 (e.g., a camera, a video camera, an infrared camera, an autonomous platform, a drone, a wearable device, etc.). The risk relationship data store 162 contains electronic records associated with prior risk relationship events at other sites along with risk relationship sensor location data for those sites. The enterprise analytics platform 180 may automatically analyze the electronic records in the risk relationship data store 162 to create a predictive analytics algorithm. The enterprise analytics platform 180 may then receive the data associated with a risk relationship at the site 110 and automatically analyze, in substantially real-time, the data associated with the risk relationship at the site 110, including data from the at least one image capturing sensor 142, using the predictive analytics algorithm.

For example, the data from the at least one image capturing sensor 142 may be used to estimate an occupancy. If the site 110 is associated with a construction site, the risk relationship at the site 110 may be associated with at least one of fire, theft, vandalism, and water damage insurance (and a higher occupancy level might result in a reduced insurance premium). If the site 110 is associated with a retail store or office, the risk relationship at the site 100 may be associated with at least one of personal injury, general liability, and workers' compensation insurance (and a lower occupancy level might result in a reduced insurance premium). Note that data from other risk relationship sensors 140 might also be analyzed to estimate occupancy. For example, the system 100 might analyze information from a door sensor (are customers entering or leaving an area, a chair sensor (is a cubicle occupied), a floor sensor, an elevator sensor (e.g., for a smart elevator reservation system), a motion detector, a wireless network utilization sensor (how many devices are currently accessing cell phone data at the location?), a WiFi utilization sensor, a wearable device (e.g., an employee badge or lanyard that is able to communicate wirelessly or via a printed QR code).

An indication of a result of the analysis may then be transmitted. In some examples, the transmitted indication of the result of the analysis is associated with an equipment use characterization (e.g., is a forklift following safety procedures). Other examples of a transmitted indication of the result of the analysis might be associated with a site space characterization (e.g., is a building lobby turning into a workspace?) or an employee behavior characterization (e.g., is an employee frequently lifting objects that are heavier than was originally expected?). In some embodiments, the indication transmitted by the enterprise analytics platform 180 comprises an electronic alert signal (e.g., an automated telephone call, an email message, a text message, etc.) that includes a potential cause of a risk relationship event and a recommended remedial action. This type of continuous IoT and camera information might be useful, for example, in terms of risk engineering and/or underwriting pricing decisions by an insurer.

Figure 2:
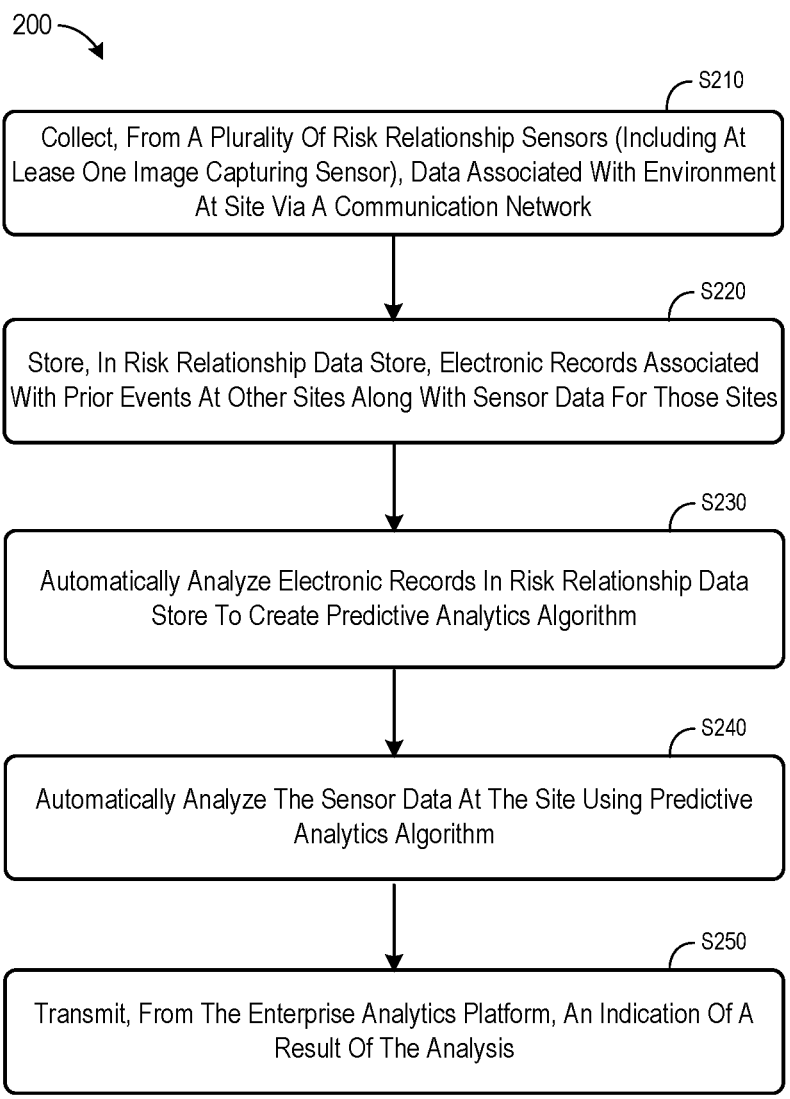
FIG. 2 illustrates a method that might be performed in accordance with some embodiments.

Note that the system 100 of FIG. 1 is provided only as an example, and embodiments may be associated with additional elements or components. According to some embodiments, the elements of the system 100 facilitate an exchange of information. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may collect, from a plurality of risk relationship sensors, including at least one image capturing sensor, data associated with a risk relationship at the site via a communication network. As described with respect to FIG. 4, each risk relationship sensor may include: (i) an environment characteristic detection element to sense an environment characteristic, (ii) a power source, and (iii) a communication device to transmit the data associated with a risk relationship. Note that different risk relationship sensors might sense different environment characteristics. For example, a system might include three sensors that each sense a different characteristic, such as an image, moisture, water flowing through a pipe, a temperature, a thermal image, video streamed from a camera, audio information detected by a microphone, a water flow volume or rate determined by a smart water meter, an alarm system, a smoke detector, etc.

At S220, the system may store, in a risk relationship data store, electronic records associated with prior risk relationship events at other sites along with risk relationship sensor location data for those sites. For example, the electronic records might be associated with data recorded from the other sites along with insurance claim damage information. Moreover, the stored information may include what types of risk relationship sensors were installed, where those sensors were located (e.g., which floor and/or office), etc. In some embodiments, third party information may be received via third-party information interface. Third-party information might be associated with, for example, historic data (e.g., flood information, precipitation data, hurricane information, earthquake data, governmental information (e.g., wind zone maps and tornado warnings, etc.) and/or current or future data (e.g., a weather forecast).

At S230, a computer processor of an enterprise analytics platform may automatically analyze the electronic records in the risk relationship data store to create a predictive analytics algorithm. According to some embodiments, the enterprise analytics platform is associated with a cloud-based computing architecture. Moreover, the predictive analytics algorithm might be associated with, for example, cognitive learning, pattern recognition, an early detection algorithm, a risk analysis, a risk score, etc.

At S240, the computer processor of the enterprise analytics platform may automatically analyze, in substantially real-time, the data associated with a risk relationship at the site (and, in some embodiments, the third-party information) using the predictive analytics algorithm. At S250, the enterprise analytics platform may transmit an indication of a result of the analysis. For example, the indication transmitted by the enterprise analytics platform might comprise an electronic alert signal (e.g., in the form of an automated telephone call, an email message, a text message, etc.). According to some embodiments, the electronic alert signal includes a potential cause of a damage event and/or a recommended remedial action.

Figure 3:
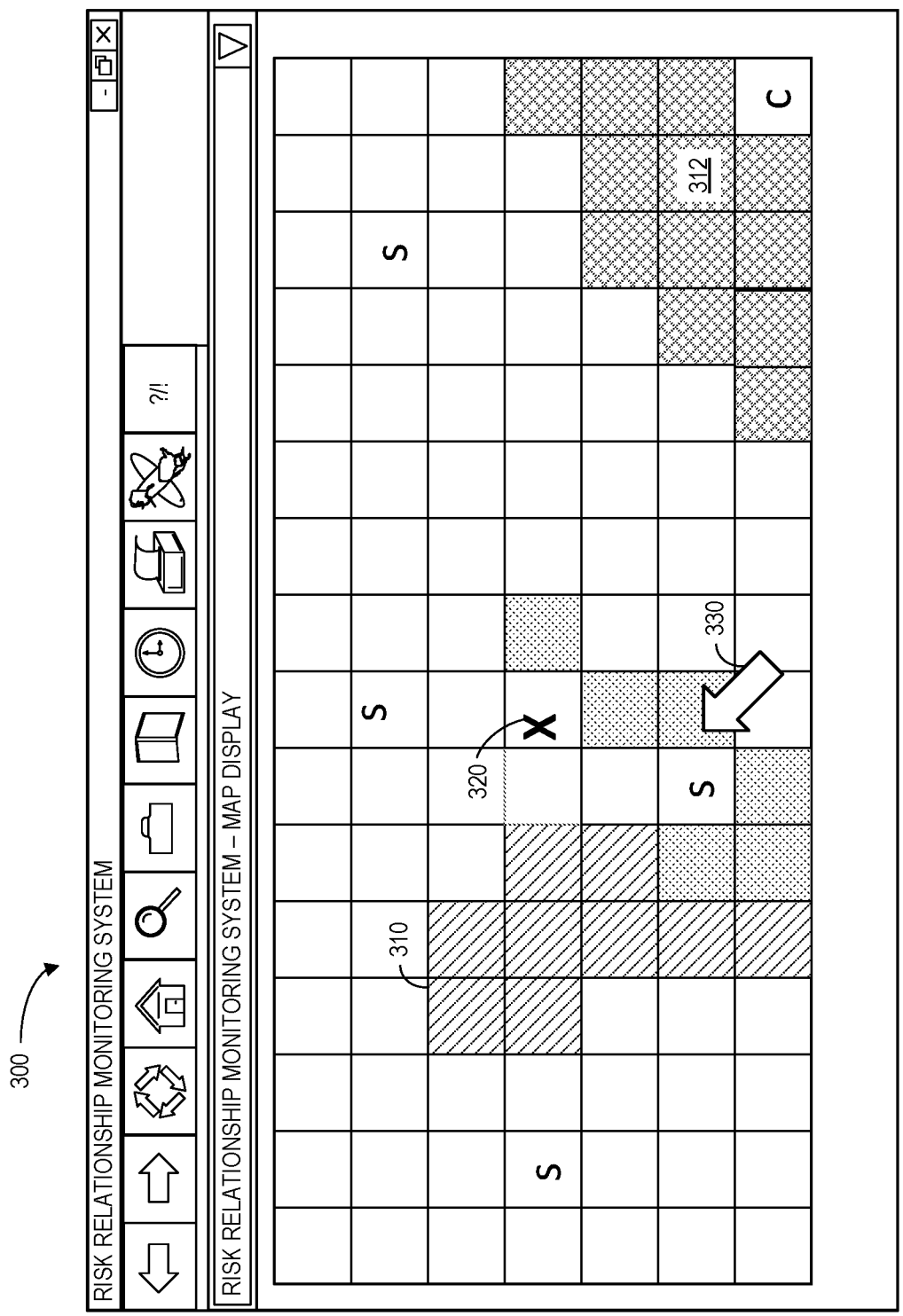
FIG. 3 illustrates an interactive operator display in accordance with some embodiments.

FIG. 3 illustrates an interactive operator display 300 in accordance with some embodiments. The display 300 includes a map showing risk relationship sensors ("S") and cameras ("C") and including areas 310, 312 that signify particular levels of potential damage or risk. In the example of FIG. 3, a first area 310 (e.g., near particular site equipment) might represent a potentially expensive amount of damage. A second area 312 might be associated with a field of view of a camera and be analyzed to detect an unanticipated level of risk. Note that the display 300 may facilitate an understanding of how different aspects of a risk relationship might be implicated. According to some embodiments, the display 300 may further include an icon 320 ("X") associated with an occurrence of a risk relationship event (e.g., a location from where it is predicted that a risk originates). In some embodiments, an operator of the display 300 may use a computer pointer 330 to select an area to receive more detailed information about risk relationship sensor data for that location.

Figure 4:
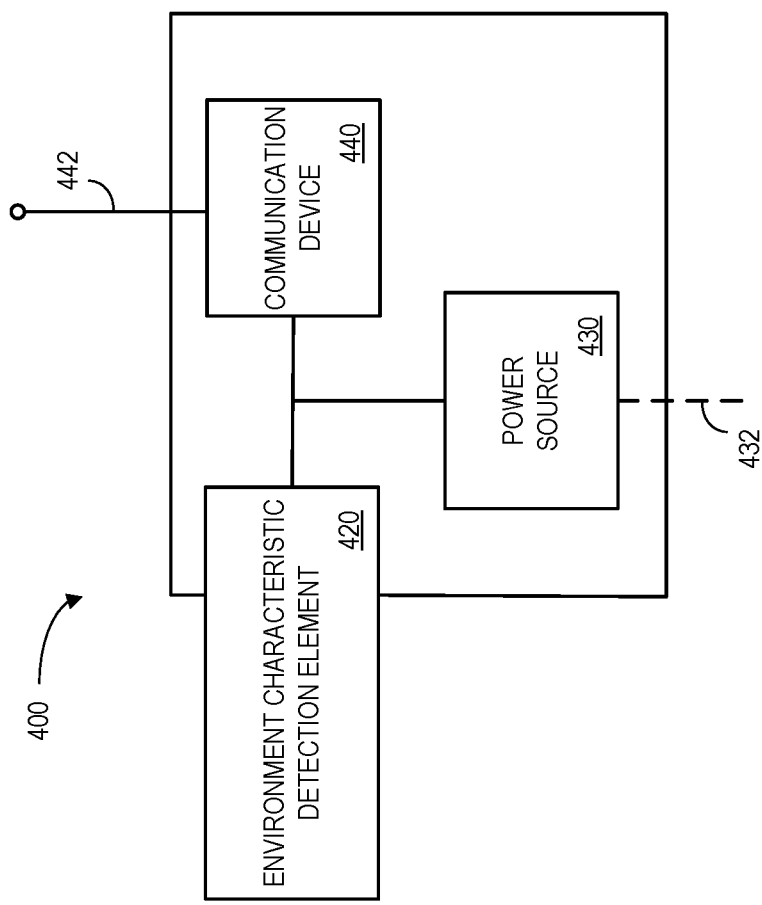
FIG. 4 is a block diagram of a risk relationship sensor according to some embodiments.

FIG. 4 is a block diagram of a risk relationship sensor 400 according to some embodiments. The risk relationship sensor 400 (and other risk relationship sensors) may be used to collect data about risk relationship information (e.g., indicating potential damage or destruction). The risk relationship sensor 400 might include, for example, an environment characteristic detection element 420 to sense moisture, a risk relationship flow, temperature, moisture, humidity, etc., a power source 430 (e.g., associated with a battery, a rechargeable battery with an 8 hour runtime, and/or an Alternating Current ("AC") power adapter 432), and a communication device 440 (e.g., with a wireless antenna 442), coupled to the environment characteristic detection element 420 and the power source 430, to transmit data about risk relationship sensor data. As used herein, the sensor 400 may be stationary if it is not typically to move between locations (although the sensor 400 might be occasionally moved from one location to another) or might be mobile (e.g., attached to an autonomous platform).

Figure 5:
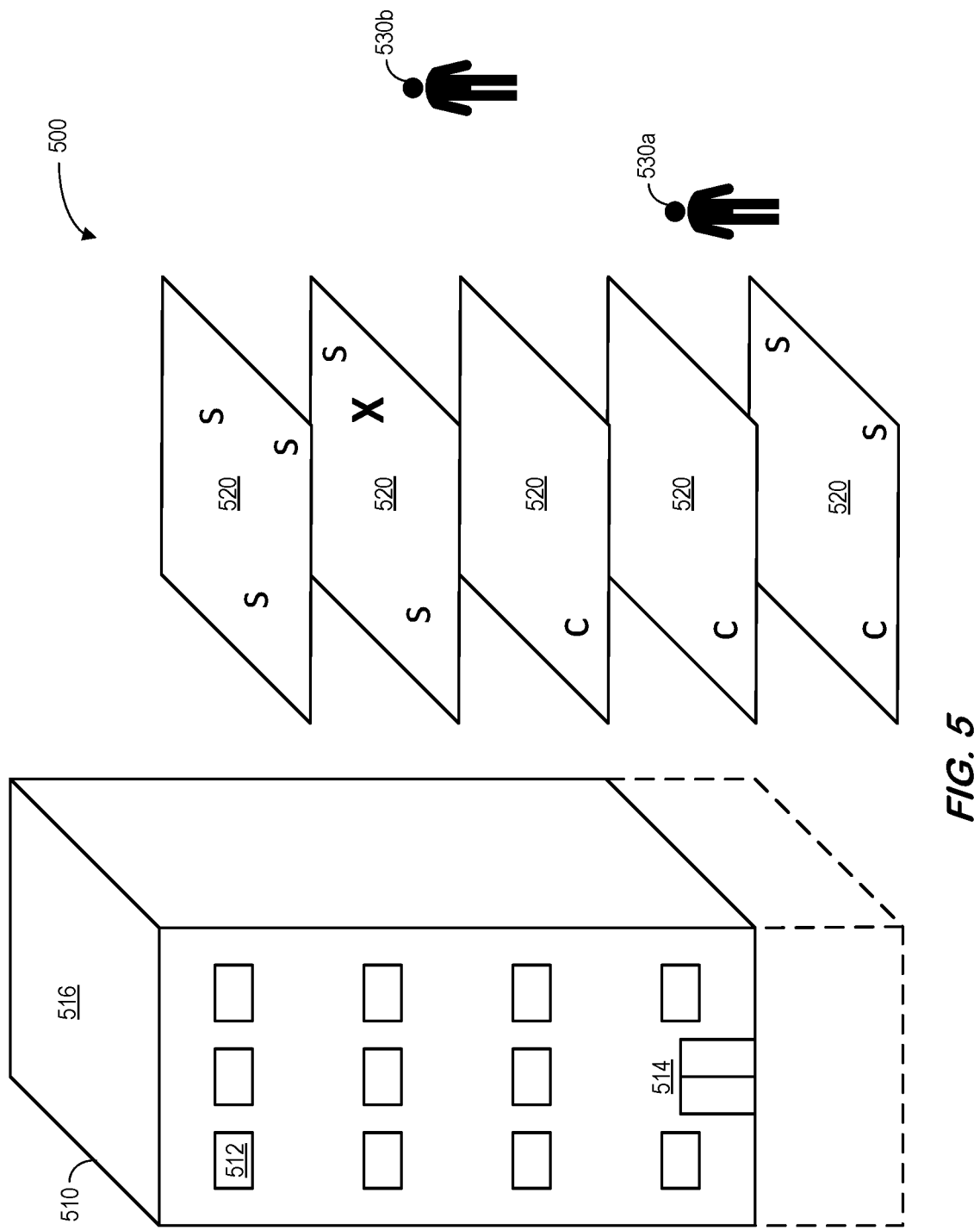
FIG. 5 is an example of site information according to some embodiments.

FIG. 5 is an example of site information 500 according to some embodiments. The information 500 might be associated with, for example, a multi-floor building 500 construction site including window data 512, door data 514, roof data 516, etc. Note that because workers falling might be a common construction site injury, a higher-level floor might be associated with greater risk as compared to a lower-level floor or the basement (illustrated with dashed lines in FIG. 5). For example, concrete workers might be associated with a lower level of risk as compared to steel workers (e.g., who construct vertical cages). The information 500 might also include floor-by-floor blueprint data 520, including the location of electrical wires, risk relationship sensors ("S"), cameras ("C"), predicted or past a risk relationship events ("X"), interior walls, flooring materials, etc. In addition to the information 500 illustrated in FIG. 5, embodiments might include other types of data including a construction schedule (when are workers present, when each floor is completed), a security schedule (when are guards present), fire protection data (sprinkler head locations), etc.

Figure 6:
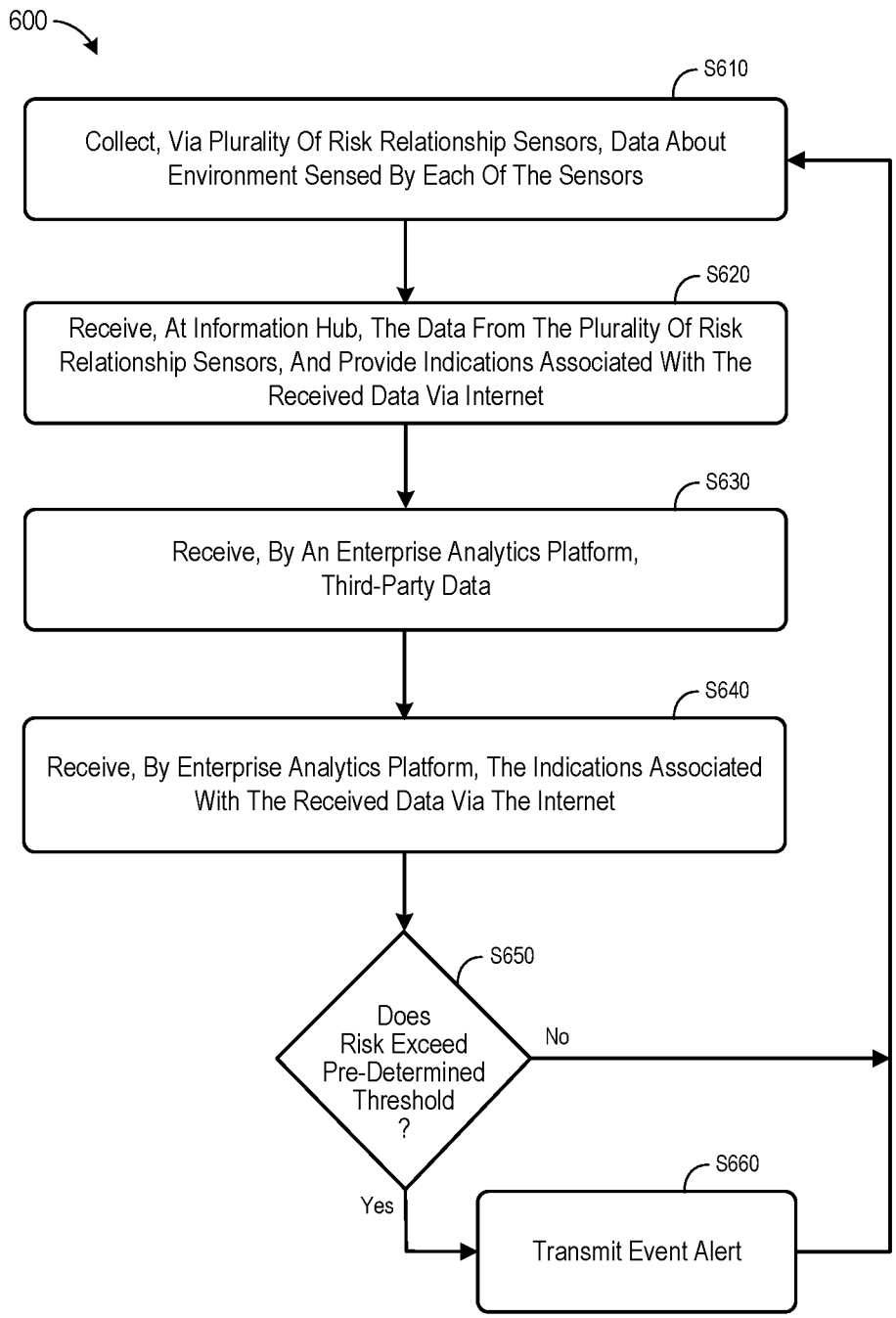
FIG. 6 illustrates an alert method that might be performed in accordance with some embodiments.

FIG. 6 illustrates an alert method 600 that might be performed in accordance with some embodiments. At S610, data associated with a risk relationship sensed by each of a plurality of risk relationship sensors, including at least one image capturing sensor, may be collected. At S620, a risk relationship information hub may receive data from the plurality of risk relationship sensors and the plurality of mobile risk relationship sensors. The risk relationship information hub may also provide indications associated with the received data via communication network (e.g., via the Internet to a cloud-based application). At S630, third-party data is received by an enterprise analytics platform (e.g., weather data, police reports, etc.).

At S640, the enterprise analytics platform may receive the indications associated with the received data via the Internet. The enterprise analytics platform may analyze the received indications to determine risk information for each of a plurality of locations within a site of an enterprise (e.g., to facilitate rendering of an interactive graphical operator interface that displays a map-based presentation of the risk relationship information for each of the plurality of locations). At S650, the enterprise analytics platform may automatically determine if damage risk exceeds a pre-determined threshold. If the threshold is not exceeded at S650, the process may continue at S610 (e.g., collecting data). If the threshold is exceeded at S650, the enterprise analytics platform may automatically generate and transmit an electronic alert message at S660 based on the damage risk information and the alert may include a potential cause of a risk relationship event (along with an indication of a remedial action). For example, the enterprise analytics platform might review camera information and recommend that a particular employee be re-categorized from an "office worker" to a "warehouse worker." Instead of a pre-determined threshold, the process at S650 might dynamically analyze the data searching for unusual patterns or types of risk and/or conditions outside of a normal range of conditions.

Figure 7:
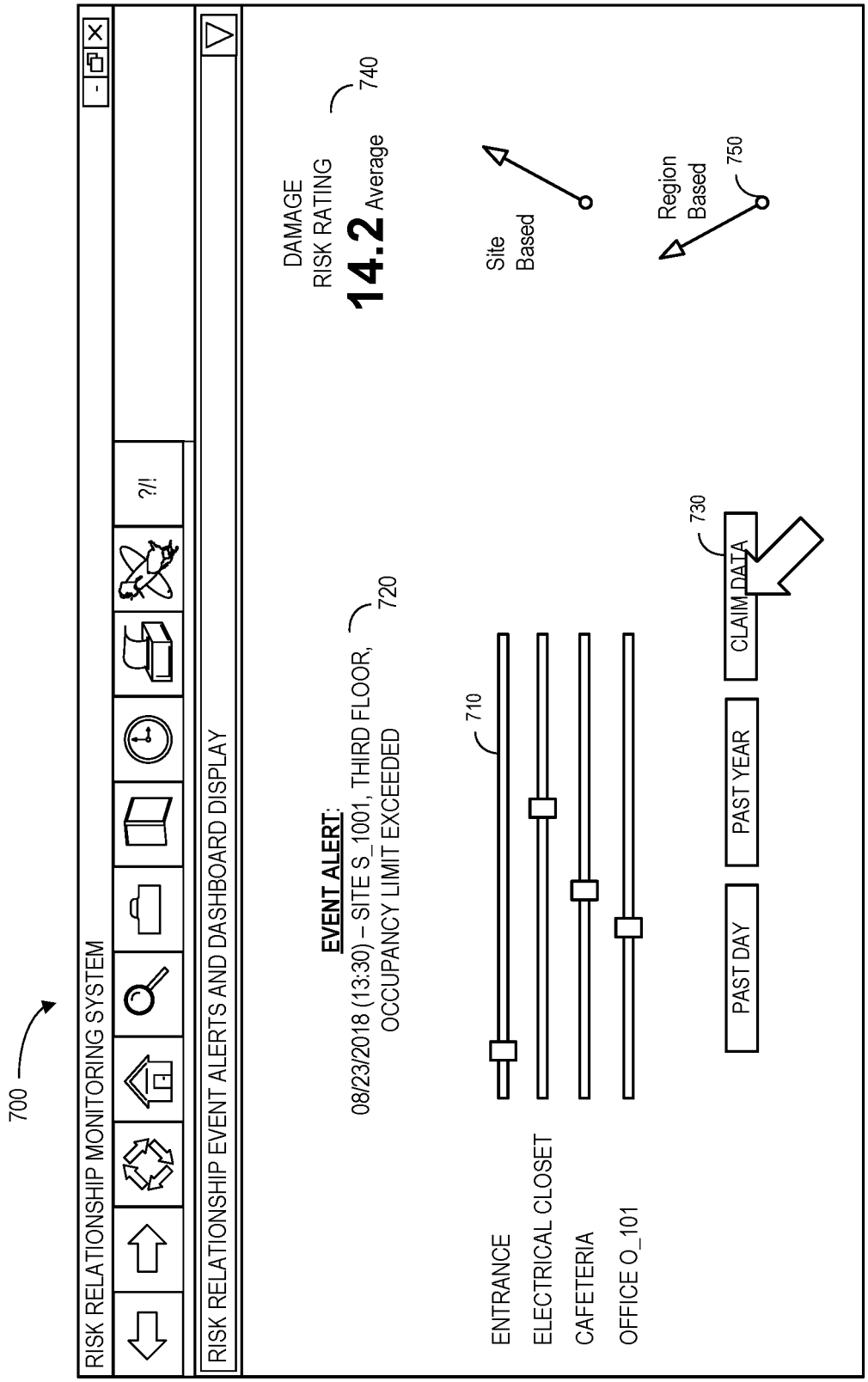
FIG. 7 illustrates an alert and dashboard display in accordance with some embodiments.

In some embodiments, an enterprise analytics platform may store risk relationship information representing a period of time (e.g., data representing the previous year). Moreover, the risk relationship information representing the period of time might be used to calculate a damage risk rating for the enterprise (e.g., a site might be classified as "moderately risky"). FIG. 7 illustrates an alert and dashboard display 700 that includes risk relationship sensor data 710 for a plurality of site locations in accordance with some embodiments. The display 700 also includes an example of an alert message 720 that might be automatically transmitted to a contractor and operator selectable options 730 (e.g., to view data associated with a particular time period, damage claim data, etc.). According to some embodiments, the display may further include an overall damage risk rating 740, classification (e.g., "average"), and/or dashboard-type display elements 750 (e.g., site-based and/or region-based display dials).

Figure 8:
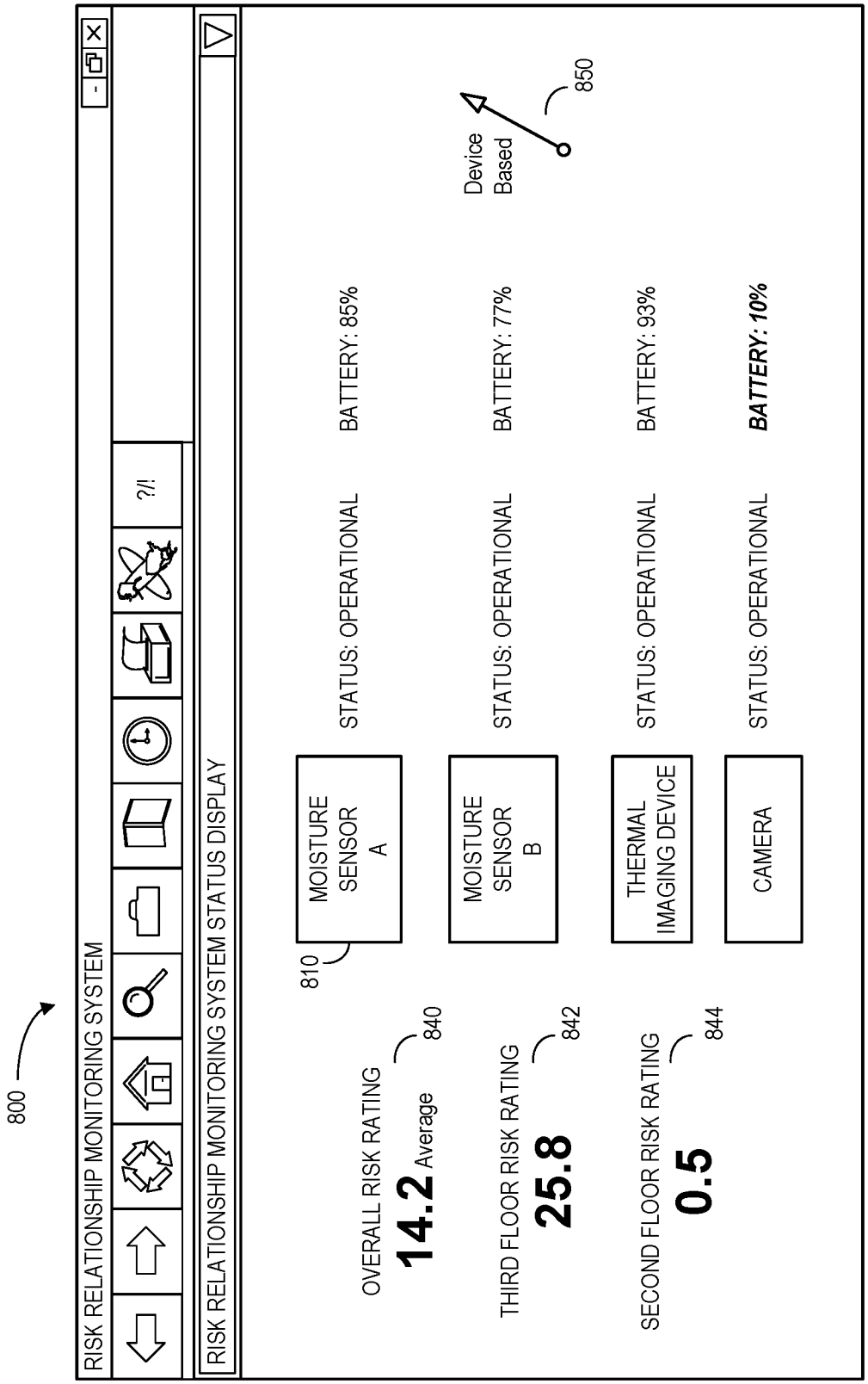
FIG. 8 illustrates a risk relationship monitoring system status display according to some embodiments.

FIG. 8 illustrates a system status display 800 that includes both an overall damage risk rating 840 and ratings 842, 844 associated with sub-regions, zones, business units, etc. of the enterprise. The system status display 800 also includes data about each individual risk relationship sensor, such as a sensor status (e.g., operational, failed, mobile, etc.) and a current battery power level associated with that sensor. The system status display 800 further includes device-level dashboard information 850 that may, according to some embodiments, be selected by an operator to see a greater level of detail about that particular device. According to some embodiments, the display 800 (or the device itself) might generate an alarm when a sensor device is not operating properly (e.g., by flashing a light, emitting a beep, etc.).

Embodiments described herein may be associated with various types of enterprises. For example, an insurer, a museum, a large retail store or shopping mall, a warehouse, a library, a chemical laboratory, a factory, etc. might all be interested in monitoring and/or processing risk relationship information.

Figure 9:
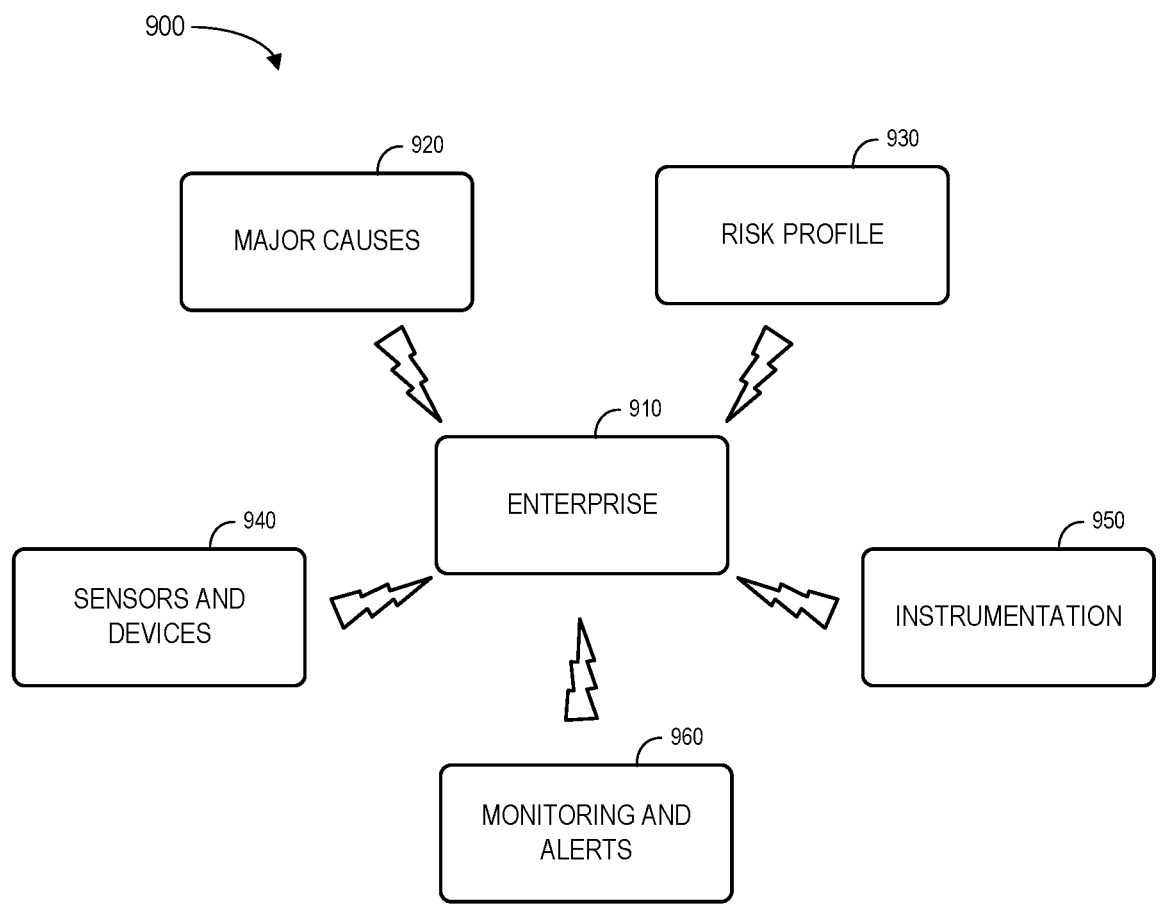
FIG. 9 is a construction or renovation damage overview according to some embodiments of the present invention.

FIG. 9 is a construction or damage overview 900 according to some embodiments. An enterprise 910 (e.g., an insurance company, building owner, contractor, etc.) may implement loss control and/or proactive a risk relationship management program to decrease claims payout and/or improve customer service. Note that the major causes 920 of damage might include flawed workmanship, weather, product defects, improper supervision, theft, sabotage, etc. The risk profile 930 might be associated with, for example, an insurance premium and/or duration until a building is 75% complete and "buttoned-up" (with at least temporary heating). The sensors and devices 940 might include cameras, moisture sensors, temperature sensors, motion detectors, mold sensors, flow sensors and valves, cloud connectivity, long battery life, on-site Wi-Fi, etc. The instrumentation 950 might include moisture sensors in unfinished areas, temperature sensors in exposed areas, water pressure valves in secondary pipes, etc. The monitoring and alerts 960 might include real-time alerts, sensor statistics, cognitive learning, pattern recognition, early detection algorithms, remote shutdown via mobile application, etc.

Figure 10:
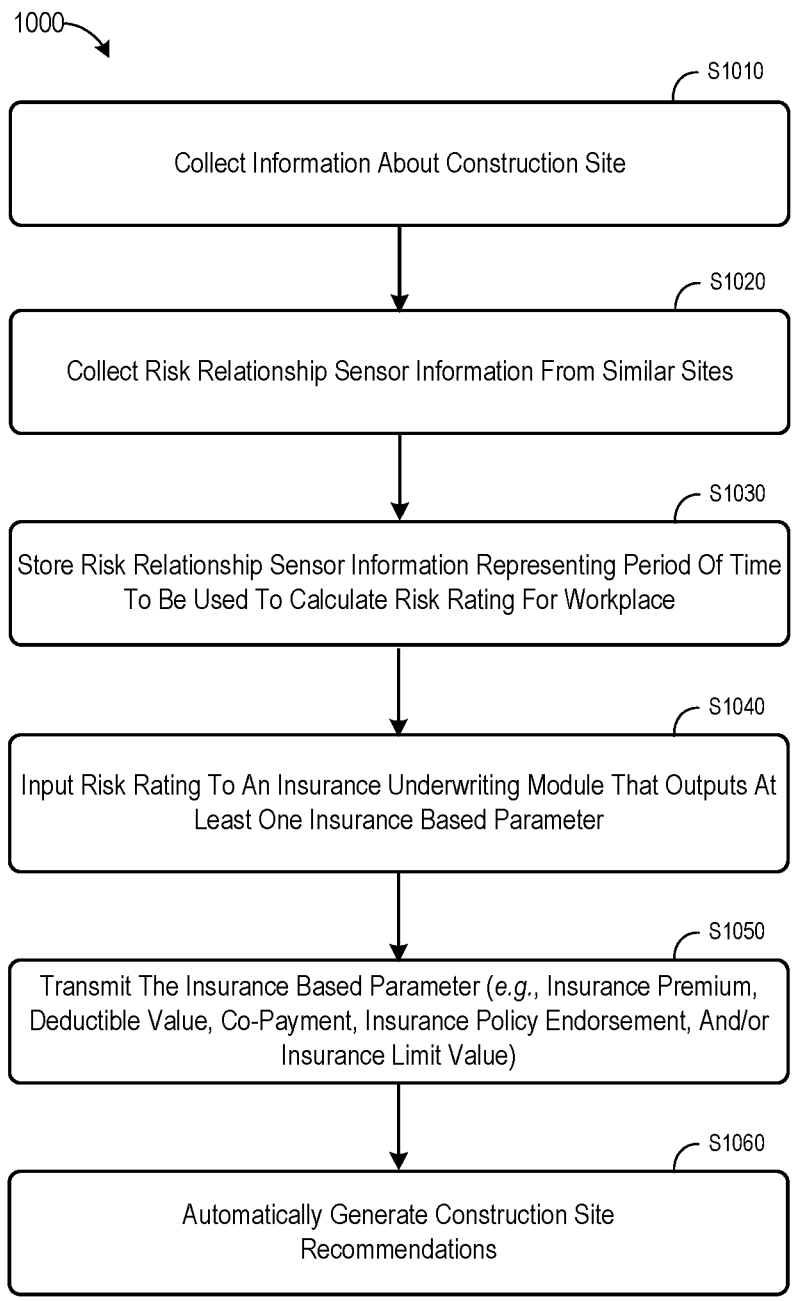
FIG. 10 illustrates an insurance rating method that might be performed in accordance with some embodiments.

According to some embodiments, an overall damage rating may be used as an input to an insurance underwriting module that generates at least one insurance-based parameter. FIG. 10 illustrates an insurance rating method 1000 that might be performed in accordance with some embodiments. At S1010, information about a site may be collected (e.g., associated with a type of industry, a building size, Building Code Effectiveness Grading ("BCEG") data, etc.). At S1020, risk relationship sensor information may be collected (e.g., in accordance with any of the embodiments described herein). At S1030, risk relationship sensor information may be stored to represent a period of time to be used to calculate a damage risk rating for the site. For example, a numerical rating or a rating category might be automatically calculated (e.g., a site may receive a "yellow" rating indicating a moderate risk of damage). At S1040, the risk relationship damage risk rating is input to an insurance underwriting module that outputs at least one insurance-based parameter. For example, the insurance underwriting module might automatically calculate an insurance premium based at least in part on the damage risk rating. At S1050, the system transmits an indication of the insurance based parameter (e.g., associated with an insurance premium, a deductible value, a co-payment, an insurance policy endorsement, and/or an insurance limit value). For example, a site classified as "low risk" might receive a percent or fixed premium discount for damage loss insurance (e.g., because fewer hearing-related claims might be expected as compared to "very risky" sites). At S1060, the system may automatically generate and transmit workplace and/or employee recommendations. For example, an enterprise analytics platform might automatically recommend that on-site equipment be moved to reduce the risk of damage, injury, or loss. According to some embodiments, the system may also pre-populate data elements (e.g., associated with an insurance claim template) to improve the accuracy of the information and/or improve claim processing time.

Figure 11:
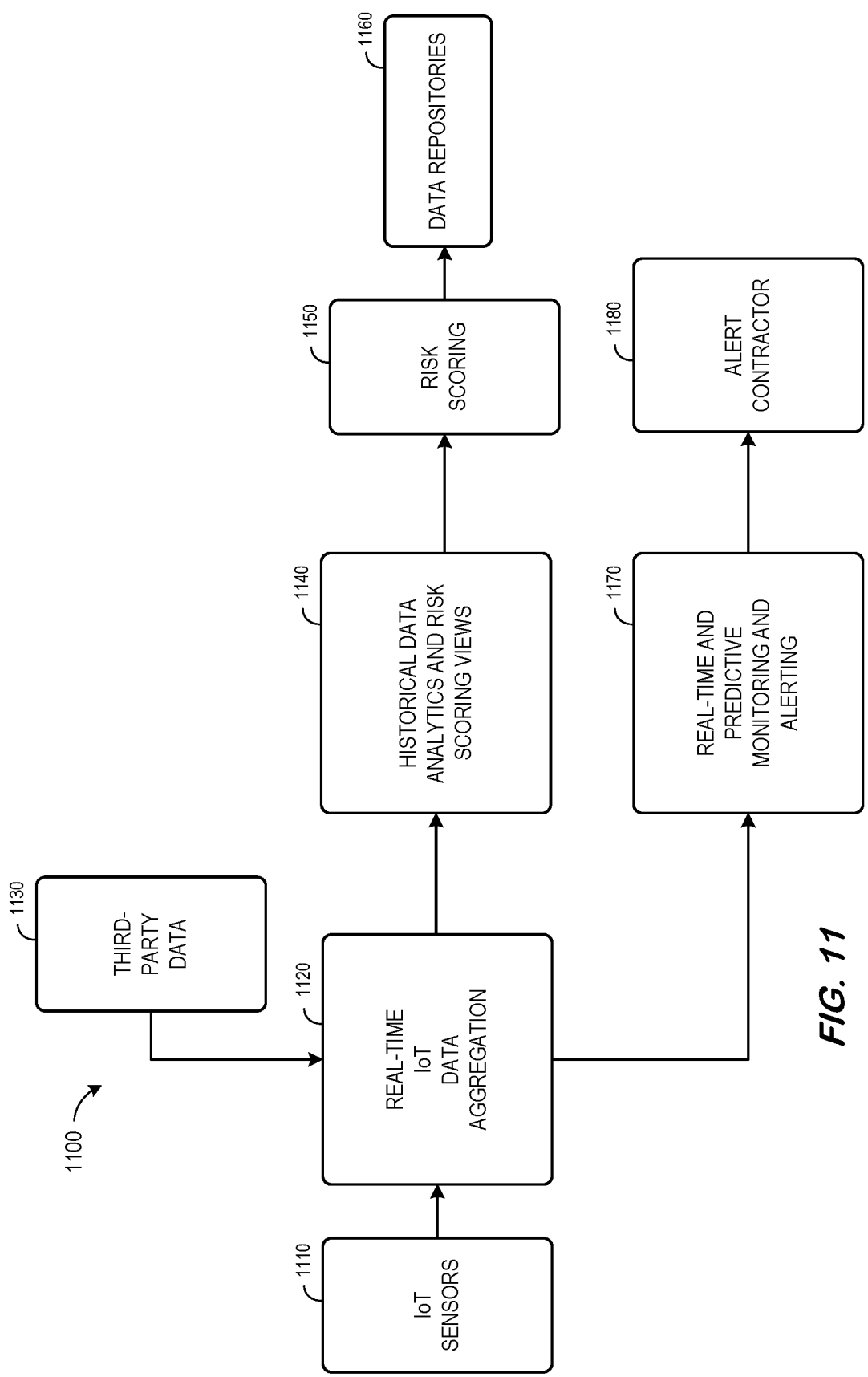
FIG. 11 is a risk relationship sensor data Internet of Things approach according to some embodiments.

FIG. 11 is a risk relationship sensor data Internet of Things ("IoT") approach 1100 according to some embodiments. At 1110, risk relationship sensors (including, in some embodiments, at least one camera) may detect risk relationship information in substantially real time (sensors may also measure temperatures, a risk relationship pressure, real time thermal images, etc.). According to some embodiments, sensors may be mounted at fixed places in the site and an indoor positioning system may provide location information. For example, beacons (e.g., Bluetooth enabled beacons for indoor locations) may transmit a Universally Unique Identifier ("UUID") to IoT sensors/devices within range. The sensors may provide data to a real-time IoT data aggregation component 1120 through a secure transport and/or a cloud-based architecture (e.g., via Wi-Fi connection, 3G or 4G cellular network, etc.). The data might include, for example, key sensor information including device type, location, and battery levels for each sensor. The real-time IoT data aggregation component 1120 may, according to some embodiments, also receive third-party data 1130, such as historical or current weather data, BCEG information, etc. The real-time IoT data aggregation 1120 might include, for example: registering and/or configuring IoT devices for a given customer or location; receiving real-time sensor data streamed for IoT devices; augmenting IoT data with real-time weather and other third-party data; etc.

Data that does not include Personally Identifiable Information ("PII") may then be sent to historical data analytics and risk scoring views 1140 (e.g., associated with an insurer who insures the site). Risk scoring 1150 may then be performed (e.g., for underwriting, risk engineering, and data science purposes) and provided to data repositories 1160 (e.g., storing insurance claims, actuary data, underwriting information, data science records, etc.).

Information from the real-time IoT data aggregation 1120 may also be provided to a real-time and predictive monitoring and alerting component 1170, which might perform cognitive learning and pattern recognition, generate analytics models to analyze sensor data, detect damage risk and perform early detection tasks, and execute device status and monitoring. Note that an IoT network may be used to transfer the collected risk relationship sensor data. For example, data may be transferred in accordance with a Message Queuing Telemetry Transport ("MQTT") light weight messaging protocol for use on top of the TCP/IP protocol. The IoT network may register/configure IoT devices for a given customer and/or location. The IoT network may also receive risk relationship sensor data streamed directly from IoT devices. The real-time and predictive monitoring and alerting component 1170 may then transmit an alert to a contractor 1180, subcontractor, insurer, leasee, building owner, security service, etc. According to some embodiments, an entity might utilize a mobile application to view a live camera feed from the construction site and/or to reduce or stop a risk event by sending a shut-down commend to one or more devices.

Figure 12:
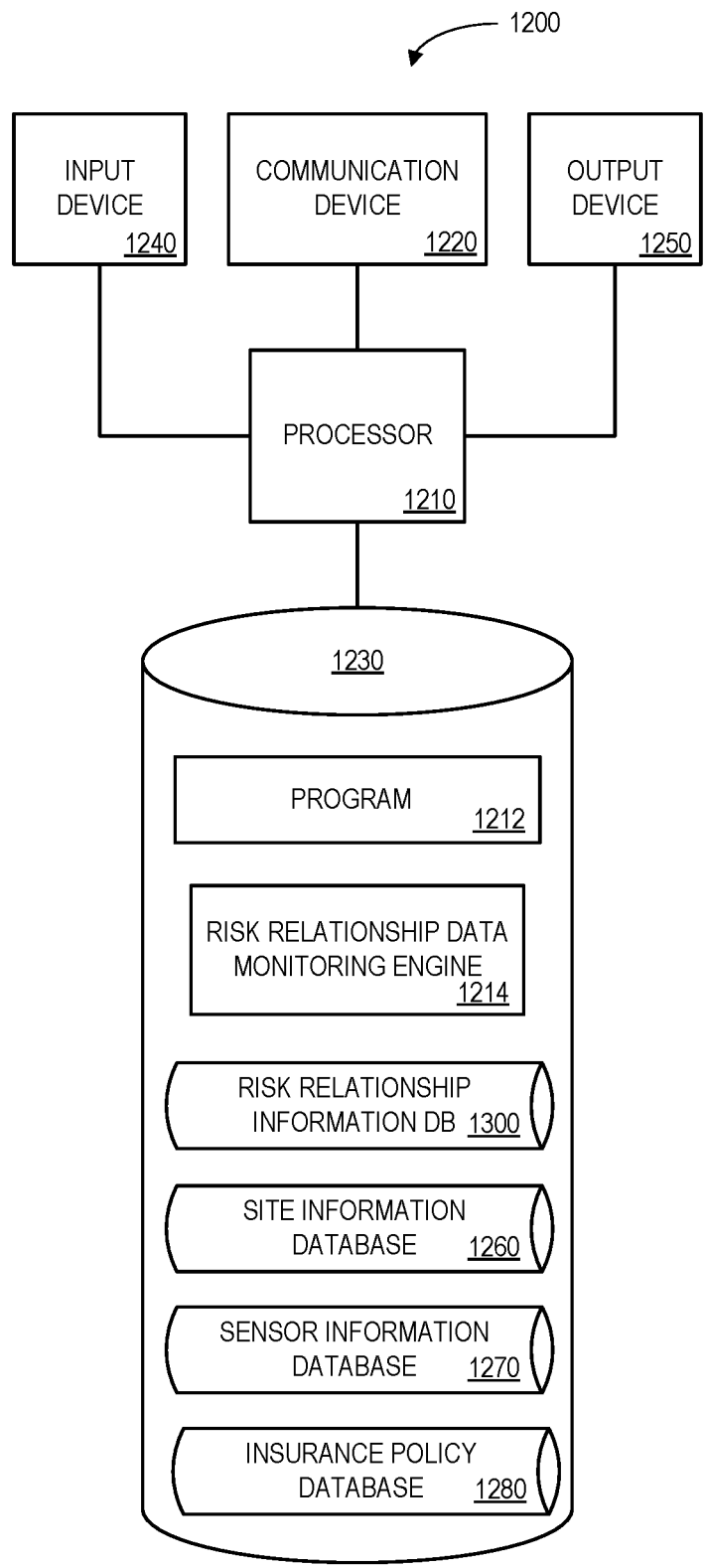
FIG. 12 is block diagram of a risk relationship monitoring tool or platform according to some embodiments of the present invention.

The embodiments described herein may be implemented using any number of different hardware configurations. For example, FIG. 12 illustrates an enterprise analytics platform 1200 that may be, for example, associated with the systems 100, 900 of FIGS. 1 and 9, respectively. The enterprise analytics platform 1200 comprises a processor 1210, such as one or more commercially available Central Processing Units (CPUs) in the form of one-chip microprocessors, coupled to a communication device 1220 configured to communicate via communication network (not shown in FIG. 12). The communication device 1220 may be used to communicate, for example, with one or more remote risk relationship sensors, risk relationship information hubs, etc. Note that communications exchanged via the communication device 1220 may utilize security features, such as those between a public internet user and an internal network of the insurance enterprise. The security features might be associated with, for example, web servers, firewalls, and/or PCI infrastructure. The enterprise analytics platform 1200 further includes an input device 1240 (e.g., a mouse and/or keyboard to enter information about risk relationship sensors and/or a construction site) and an output device 1250 (e.g., to output reports regarding system administration, a risk relationship event alerts, site modification recommendations, insurance policy premiums, etc.).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a risk relationship data monitoring engine or application 1214 for controlling the processor 1210. The processor 1210 performs instructions of the programs 1212, 1214, and thereby operates in accordance with any of the embodiments described herein. For example, the processor 1210 may receive from a risk relationship data store electronic records associated with prior risk relationship events at other sites along with risk relationship sensor location data for those sites. The processor 1210 may also receive third-party information and automatically analyze the electronic records to create a predictive analytics algorithm. The data associated with a risk relationship at the site and the third-party information may then be automatically analyzed by the processor 1210 using the predictive analytics algorithm, and a result of the analysis may then be transmitted (e.g., to a party associated with the site or an on-site a risk relationship shut-off valve).

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the enterprise analytics platform 1200 from another device; or (ii) a software application or module within the enterprise analytics platform 1210 from another software application, module, or any other source.

In some embodiments (such as shown in FIG. 12), the storage device 1230 includes a risk relationship information database 1300, a site information database 1260 (e.g., storing information about an industry type, square footage, work schedules, etc.), a sensor information database 1270 (e.g., storing sensor types, IP addresses, site locations, etc.), and an insurance policy database 1280 (e.g., storing information about past damage loss insurance claims, current premium values, etc.). An example of a database that may be used in connection with the enterprise analytics platform 1200 will now be described in detail with respect to FIG. 13. Note that the database described herein is only an example, and additional and/or different information may be stored therein. Moreover, various databases might be split or combined in accordance with any of the embodiments described herein. For example, the insurance policy database 1280 and/or risk relationship information database 1300 might be combined and/or linked to each other within the risk relationship data monitoring engine 1214.

Figure 13:
FIG. 13 is a tabular portion of a risk relationship information database according to some embodiments.

Referring to FIG. 13, a table is shown that represents the risk relationship information database 1300 that may be stored at the enterprise analytics platform 1200 according to some embodiments. The table may include, for example, entries identifying risk relationship monitoring sample collections. The table may also define fields 1302, 1304, 1306, 1308, 1310 for each of the entries. The fields 1302, 1304, 1306, 1308, 1310 may, according to some embodiments, specify: a site location identifier 1302, an enterprise name 1304, a date/time 1306, damage risk data 1308, and an alert indication 1310. The risk relationship information database 1300 may be periodically created and updated, for example, based on information electrically received from risk relationship sensors, cameras, and/or a risk relationship information hub via cloud-based application.

The site location identifier 1302 and enterprise name 1304 may be, for example, unique alphanumeric codes identifying a particular construction site location for an enterprise (e.g., associated with a latitude/longitude, X/Y coordinate, etc.). The date/time 1306 and damage risk data 1308 might indicate a calculated level of risk at a particular time for a location. The alert indication 1310 might indicate whether or not an alert signal was transmitted responsive to the risk relationship damage risk data 1308. For example, as illustrated by the third entry in the table 1300, an alert 1310 might be generated when damage risk data exceeds "5.5" for a given location.

Figure 14:
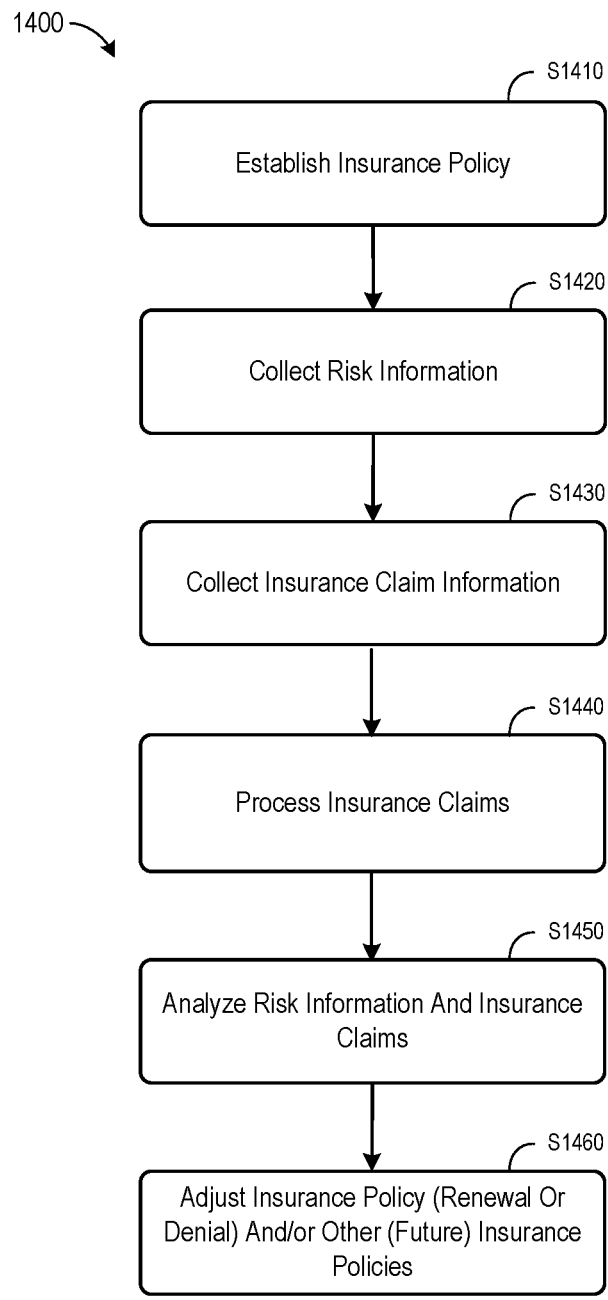
FIG. 14 illustrates an overall enterprise method that might be performed in accordance with some embodiments.

FIG. 14 illustrates an overall enterprise method 1400 that might be performed in accordance with some embodiments. At S1410, the enterprise may establish an insurance policy with an insured. For example, an insurance company may issue damage loss insurance policy to a business. At S1420, the enterprise (either directly or with the help of the insured) may collect risk relationship information. For example, the insurance company may video streams throughout a construction site along with other risk relationship sensor data. At S1430, the enterprise may collect a risk relationship event insurance claim information (e.g., including amounts of loss and/or potential causes of the losses). At S1440, the enterprise may process damage loss insurance claims (e.g., making payments to insured parties as appropriate). At S1450, the enterprise may analyze risk relationship information and damage loss insurance claims. At S1460, the enterprise may adjust the insurance policy (e.g., including a decision to renew, or not renew, various insurance policies) and/or other (future) insurance policies. For example, the insurance company might lower (or raise) an existing premium, adjust underwriting guidelines for a particular industry, etc. According to some embodiments, the willingness and ability of an enterprise to implement and/or enforce risk relationship sensor data collection might be indicative of an overall level of risk associated with that enterprise (e.g., associated with other types of insurance policies).

Figure 15:
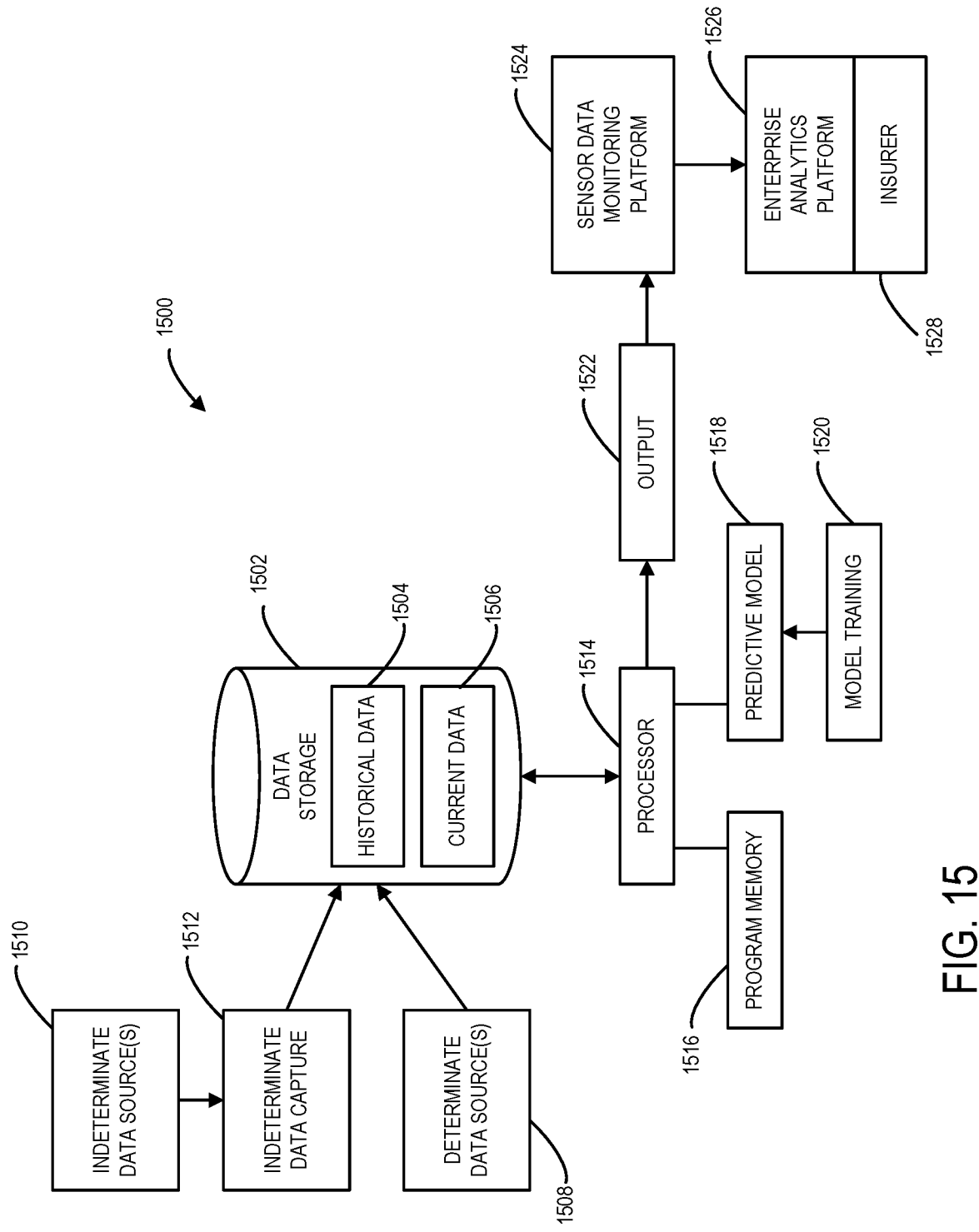
FIG. 15 illustrates a system associated with a predictive model according to some embodiments.

According to some embodiments, one or more predictive models may be used to generate noise models or help underwrite insurance policies and/or predict potential hearing damage based on prior events and claims. Features of some embodiments associated with a predictive model will now be described by first referring to FIG. 15. FIG. 15 is a partially functional block diagram that illustrates aspects of a computer system 1500 provided in accordance with some embodiments of the invention. For present purposes, it will be assumed that the computer system 1500 is operated by an insurance company (not separately shown) to support risk relationship sensor data monitoring and processing.

The computer system 1500 includes a data storage module 1502. In terms of its hardware the data storage module 1502 may be conventional, and may be composed, for example, of one or more magnetic hard disk drives. A function performed by the data storage module 1502 in the computer system 1500 is to receive, store and provide access to both historical claim transaction data (reference numeral 1504) and current claim transaction data (reference numeral 1506). As described in more detail below, the historical claim transaction data 1504 is employed to train a predictive model to provide an output that indicates potential damage patterns, and the current claim transaction data 1506 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing event impacts and damage amounts.

Either the historical claim transaction data 1504 or the current claim transaction data 1506 might include, according to some embodiments, determinate and indeterminate data. As used herein and in the appended claims, "determinate data" refers to verifiable facts such as the age of a building; a building type; an event type (e.g., a burst pipe or flood); a date of loss, or date of report of claim, or policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about damages.

The determinate data may come from one or more determinate data sources 1508 that are included in the computer system 1500 and are coupled to the data storage module 1502. The determinate data may include "hard" data like a claimant's name, tax identifier umber, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 1510, and may be extracted from raw files or the like by one or more indeterminate data capture modules 1512. Both the indeterminate data source(s) 1510 and the indeterminate data capture module(s) 1512 may be included in the computer system 1500 and coupled directly or indirectly to the data storage module 1502. Examples of the indeterminate data source(s) 1510 may include data storage facilities for document images, for text files (e.g., claim handlers' notes), digitized recorded voice files (e.g., claimants' oral statements, witness interviews, claim handlers' oral notes, etc.), streams of video information, etc. Examples of the indeterminate data capture module(s) 1512 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 1500 also may include a computer processor 1514. The computer processor 1514 may include one or more conventional microprocessors and may operate to execute programmed instructions to provide functionality as described herein. Among other functions, the computer processor 1514 may store and retrieve historical claim transaction data 1504 and current claim transaction data 1506 in and from the data storage module 1502. Thus, the computer processor 1514 may be coupled to the data storage module 1502.

The computer system 1500 may further include a program memory 1516 that is coupled to the computer processor 1514. The program memory 1516 may include one or more fixed storage devices, such as one or more hard disk drives, and one or more volatile storage devices, such as RAM devices. The program memory 1516 may be at least partially integrated with the data storage module 1502. The program memory 1516 may store one or more application programs, an operating system, device drivers, etc., all of which may contain program instruction steps for execution by the computer processor 1514.

The computer system 1500 further includes a predictive model component 1518. In certain practical embodiments of the computer system 1500, the predictive model component 1518 may effectively be implemented via the computer processor 1514, one or more application programs stored in the program memory 1516, and data stored as a result of training operations based on the historical claim transaction data 1504 (and possibly also data received from a third-party reporting service). In some embodiments, data arising from model training may be stored in the data storage module 1502, or in a separate data store (not separately shown). A function of the predictive model component 1518 may be to determine appropriate simulation models, results, and/or scores (e.g., a rating indicating how risky a construction site is as compared to similar sites). The predictive model component may be directly or indirectly coupled to the data storage module 1502.

The predictive model component 1518 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1500 includes a model training component 1520. The model training component 1520 may be coupled to the computer processor 1514 (directly or indirectly) and may have the function of training the predictive model component 1518 based on the historical claim transaction data 1504 and/or information about noise events, incidents, and alerts. (As will be understood from previous discussion, the model training component 1520 may further train the predictive model component 1518 as further relevant data becomes available.) The model training component 1520 may be embodied at least in part by the computer processor 1514 and one or more application programs stored in the program memory 1516. Thus, the training of the predictive model component 1518 by the model training component 1520 may occur in accordance with program instructions stored in the program memory 1516 and executed by the computer processor 1514.

In addition, the computer system 1500 may include an output device 1522. The output device 1522 may be coupled to the computer processor 1514. A function of the output device 1522 may be to provide an output that is indicative of (as determined by the trained predictive model component 1518) particular damage risk maps, events, insurance underwriting parameters, and recommendations. The output may be generated by the computer processor 1514 in accordance with program instructions stored in the program memory 1516 and executed by the computer processor 1514. More specifically, the output may be generated by the computer processor 1514 in response to applying the data for the current simulation to the trained predictive model component 1518. The output may, for example, be a monetary estimate, damage risk level, and/or likelihood within a predetermined range of numbers. In some embodiments, the output device may be implemented by a suitable program or program module executed by the computer processor 1514 in response to operation of the predictive model component 1518.

Still further, the computer system 1500 may include a sensor data monitoring platform 1524. The sensor data monitoring platform 1524 may be implemented in some embodiments by a software module executed by the computer processor 1514. The sensor data monitoring platform 1524 may have the function of rendering a portion of the display on the output device 1522. Thus, the sensor data monitoring platform 1524 may be coupled, at least functionally, to the output device 1522. In some embodiments, for example, the sensor data monitoring platform 1524 may direct workflow by referring, to an enterprise analytics platform 1526, work site recommendations, modification recommendations, underwriting parameters, and/or alerts generated by the predictive model component 1518 and found to be associated with various results or scores. In some embodiments, this data may be provided to an insurer 1528 who may modify insurance parameters as appropriate.

Figure 16:
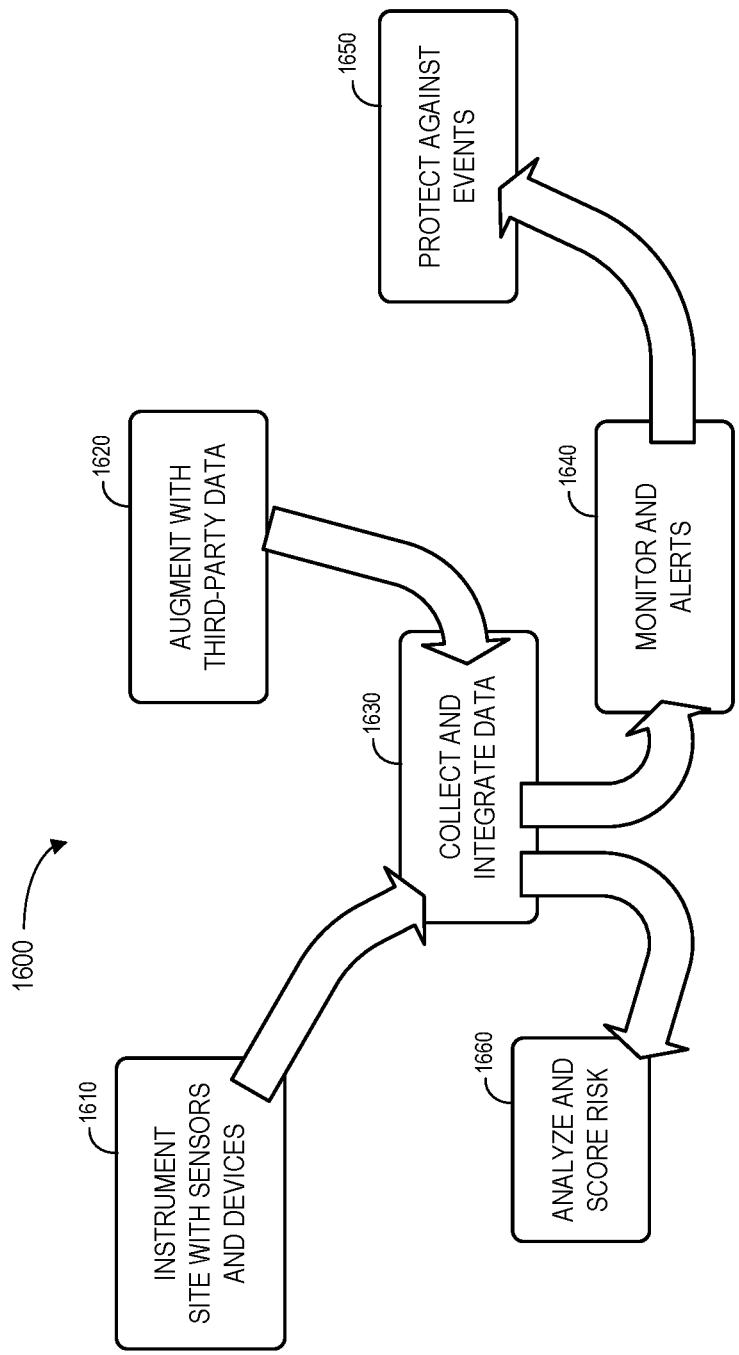
FIG. 16 is another construction or renovation damage overview in accordance with some embodiments.

Thus, the computer system 1500 may be used to create one or more analytic models to help monitor and/or mitigate damage risk. For example, FIG. 16 is another construction or renovation damage overview 1600 according to some embodiments of the present invention. Initially, an entity (e.g., an insurance company) may instrument a construction site with sensors and devices 1610. The sensors and devices 1610 might include, for example, video cameras, motion sensors, etc. The sensors and devices 1610 might, according to some embodiments, include smart meters, including those that use Advanced Metering Infrastructure ("AMI") and/or Automated Meter Reading ("AMR"). Such smart meters may be used for the dual purposes of measuring and monitoring a risk relationship sensor. According to some embodiments, the sensors and devices 1610 may include mobile and/or autonomous devices (e.g., self-piloted drones or other robotics).

The information from the sensors may be augmented with third-part data 1620, such as weather data, US governmental flood zone maps, etc. The system may then collect and integrate the data 1630 using, for example Artificial Intelligence ("AI"), machine learning, or similar techniques. In this way, a process to monitor the data and generate alerts 1640 may be provided. For example, a contractor might be automatically notified of a potential problem so that he or she can take corrective action. As other examples, a site security firm and/or insurer might be automatically notified about a potential a risk relationship event. In this way, the system may protect against damage events 1650 including leaks, product defect failures, employee misclassifications, improper installation, sabotage, etc. The collected data may also be used to analyze and score risk 1660. For example, damage risk score might be calculated using analytics models to process sensor data, cognitive learning and pattern recognition to assess a future damage risk situation, etc.

Figure 17:
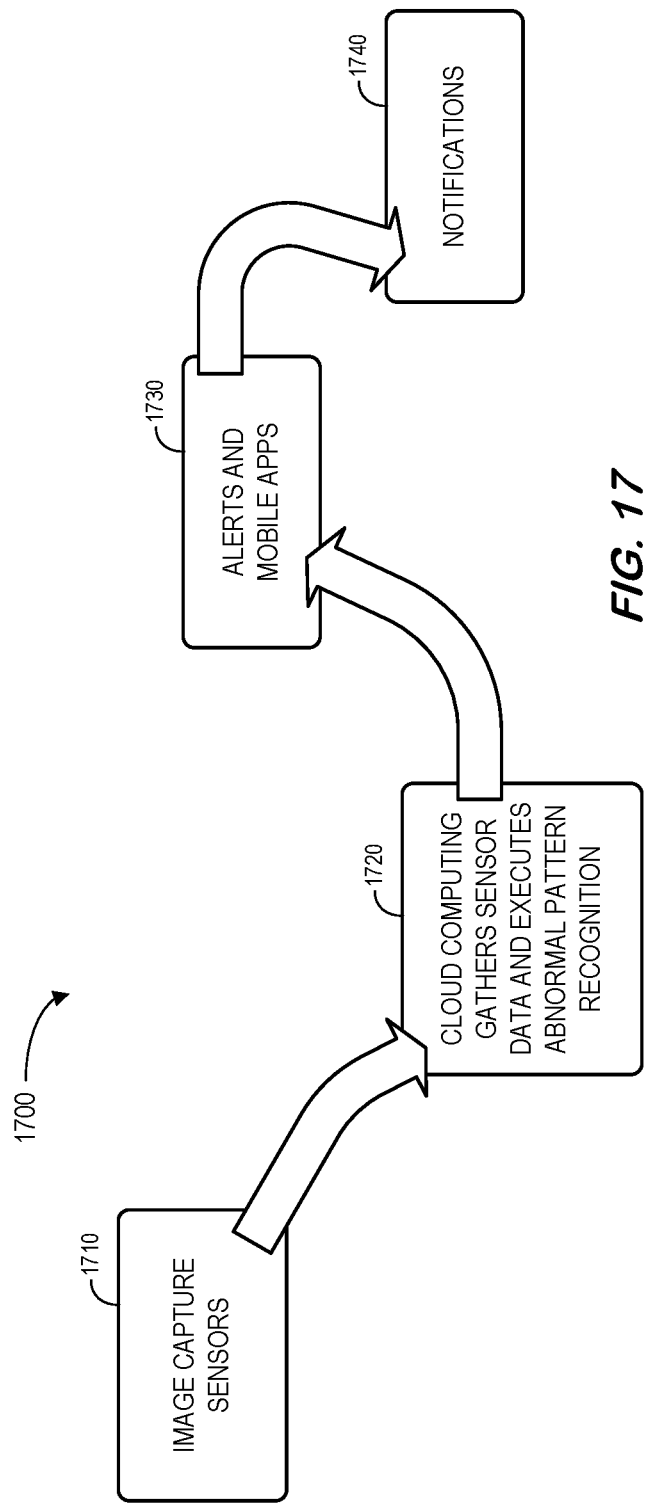
FIG. 17 illustrates end-to-end risk relationship sensor data monitoring in accordance with some embodiments.

FIG. 17 illustrates end-to-end risk relationship sensor data monitoring 1700 in accordance with some embodiments. Initially, image capture sensors 1710 (including intrusive and non-intrusive devices) may be installed at a construction site. Cloud computing may then gather sensor data and execute abnormal pattern recognition 1720. As a result, alerts (e.g., SMS, email, or smartphone alerts) 1730 may be generated. Similarly, a mobile computing application 1730 may allow for monitoring and/or for a control of a risk relationship at the construction site. Finally, contractors and/or site owners may receive notifications 1740 so that correction action can be taken in a timely fashion. Similarly, security or management firms might be notified along with an insurer to facilitate an appropriate response to a potential a risk relationship event.

Figure 18:
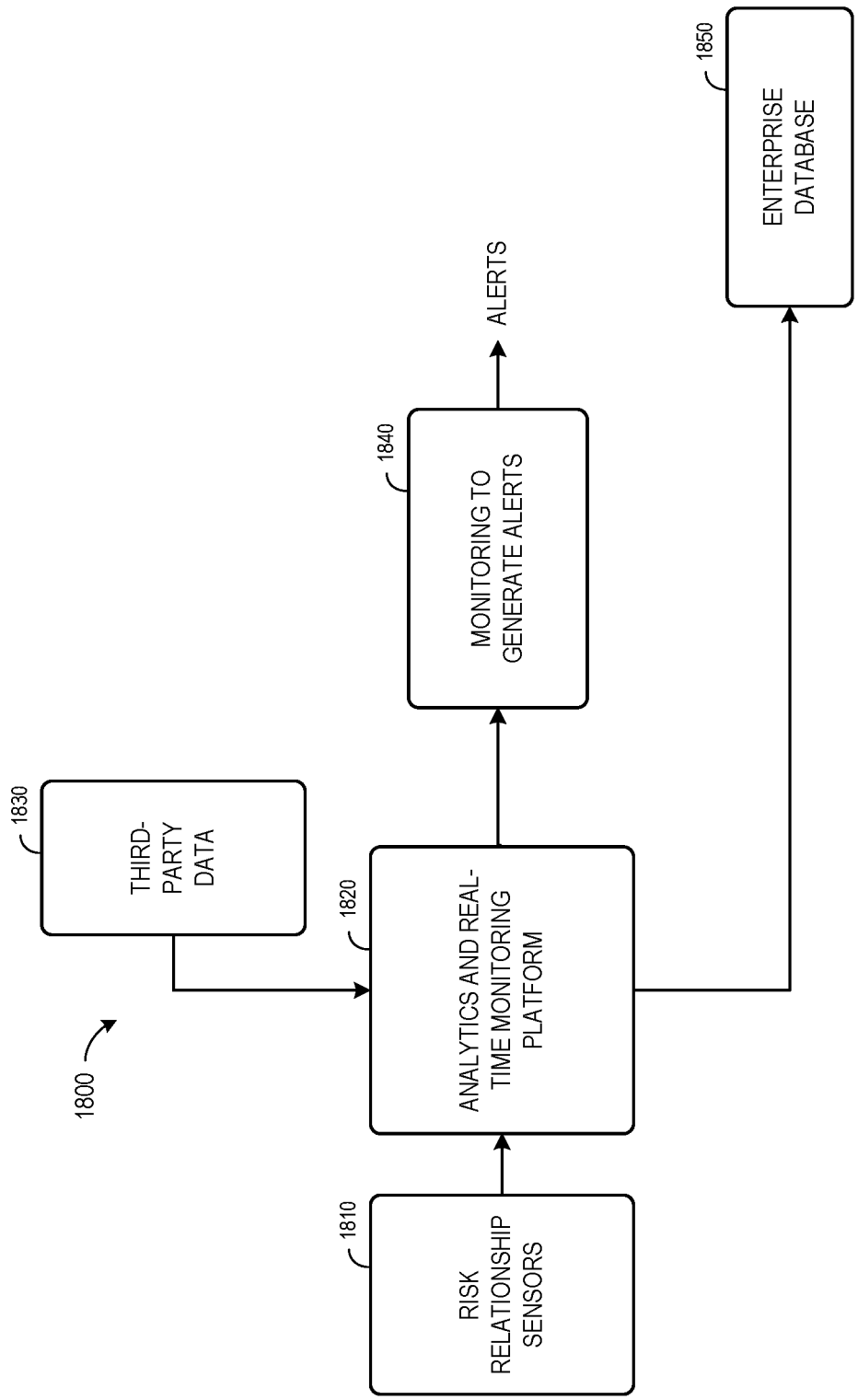
FIG. 18 is another risk relationship sensor data Internet of Things approach according to some embodiments.

FIG. 18 is another risk relationship sensor data monitoring IoT approach 1800 according to some embodiments. At 1810, risk relationship sensors (including, in some embodiments, video cameras) may detect a risk relationship information in substantially real time (sensors may also measure movement, a number of customers in a retail area, real time thermal images, etc.). According to some embodiments, sensors may be mounted at fixed places in the site and an indoor positioning system may provide location information. For example, beacons (e.g., Bluetooth enabled beacons for indoor locations) may transmit a UUID to IoT sensors/devices within range. The sensors may provide data to an analytics and real-time monitoring platform 1820 through a secure transport and/or a cloud-based architecture (e.g., via Wi-Fi connection, 4G or 5G cellular network, etc.). The data might include, for example, key sensor information including device type, location, and battery levels for each sensor.

The analytics and real-time monitoring platform 1820 may, according to some embodiments, also receive third-party data 1830, such as historical or current weather data, BCEG information, etc. The analytics and real-time monitoring platform 1820 might, for example: register and/or configure IoT devices for a given customer or location; receive real-time sensor data streamed for IoT devices; augment IoT data with real-time weather and other third-party data; etc. The system 1800 may then perform monitoring to generate alerts 1840. For example, the real-time monitoring platform 1820 might perform cognitive learning and pattern recognition, generate analytics models to analyze sensor data, detect damage risk and perform early detection tasks, and execute device status and monitoring. According to some embodiments, information from the analytics and real-time monitoring platform 1820 may also be stored in an enterprise database 1850 (e.g., storing insurance claims, actuary data, underwriting information, data science records, etc.). Information in the enterprise database 1850 may then be used to pre-populate at least one data element in a template associated with a risk relationship event at the site (e.g., to partially fill out insurance claim damage form).

Thus, embodiments may provide an automated and efficient way to facilitate monitoring and processing of risk relationship sensor data. The results of such monitoring and processing might be used, for example, by a risk engineering team, an underwriting team, an account pricing team, etc. (including use for pre-quote and/or post-quote operations). The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
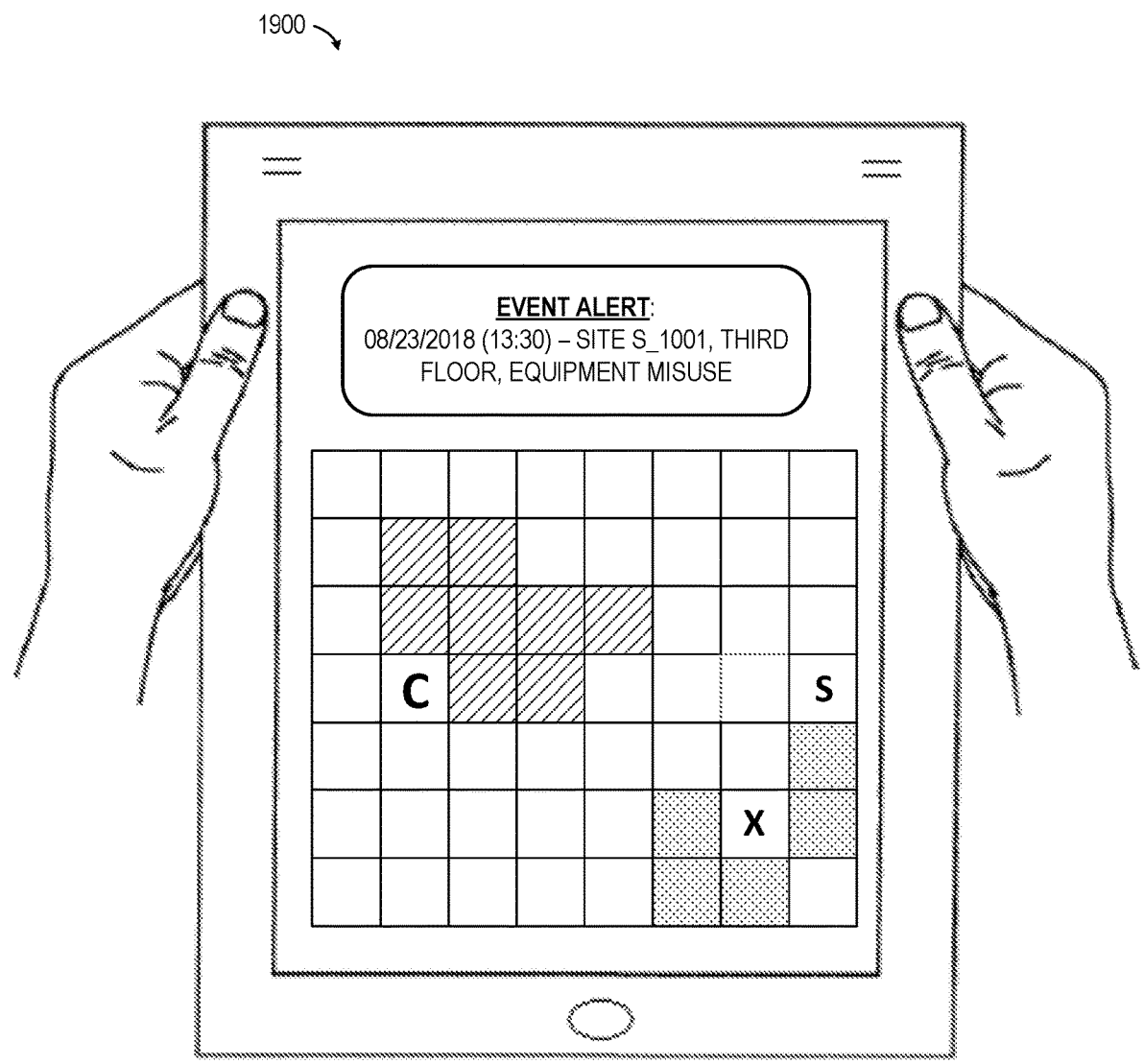
FIG. 19 illustrates an interactive operator display on a portable device in accordance with some embodiments.

Although specific hardware and data configurations have been described herein, note that any number of other configurations may be provided in accordance with embodiments of the present invention (e.g., some of the information associated with a risk relationship events and/or events might be implemented as an augmented reality display and/or the databases described herein may be combined or stored in external systems). Moreover, although embodiments have been described with respect to risk relationship information, embodiments may instead be associated with other types of construction site protection. For example, embodiments might be used in connection with snowfall damage (e.g., by measuring roof stress), slip and fall risk, wind damage, etc. Still further, the displays and devices illustrated herein are only provided as examples, and embodiments may be associated with any other types of user interfaces. For example, FIG. 19 illustrates a handheld alert and site map display 1900 according to some embodiments. According to some embodiments, elements of the display 1900 are selectable (e.g., via touch screen) to adjust and/or see more information about that particular element.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system associated with a site, comprising:
 a plurality of risk relationship sensors, including at least one image capturing sensor, each risk relationship sensor including:
  an environment characteristic detection element to sense an environment characteristic,
  a power source, and
  a communication device, coupled to the environment characteristic detection element and the power source, to transmit data associated with a risk relationship at the site via communication network;
 a risk relationship data store containing electronic records associated with prior risk relationship events at other sites along with risk relationship sensor location data for those sites; and
 an enterprise analytics platform, coupled to the risk relationship data store and a third-party information interface, including a computer processor programmed to:
  (i) automatically analyze the electronic records in the risk relationship data store to create a predictive analytics algorithm,
  (ii) receive the data associated with a risk relationship at the site,
  (iii) automatically analyze, in substantially real-time, the data associated with the risk relationship at the site, including data from the at least one image capturing sensor, using the predictive analytics algorithm, and
  (iv) transmit an indication of a result of the analysis including a map showing all of: 1. fixed risk relationship sensor locations and at least one fixed image capturing sensor location, wherein at least one fixed image capturing sensor location is a camera location, and 2. areas that signify particular levels of potential damage, wherein potential damage is the capacity for future damage and the particular levels relate to a cost of the potential damage.

2. The system of claim 1, wherein the image capturing sensor comprises at least one of: (i) a camera, (ii) a video camera, (iii) an infrared camera, (iv) an autonomous platform, (v) a drone, and (vi) a wearable device.

3. The system of claim 2, wherein the data from the at least one image capturing sensor is used to estimate an occupancy.

4. The system of claim 3, wherein the site is associated with a construction site, the risk relationship at the site is associated with at least one of fire, theft, vandalism, and water damage insurance, and a higher occupancy level results in a reduced insurance premium.

5. The system of claim 3, wherein the site is associated with a retail store or office, risk relationship at the site is associated with at least one of personal injury, general liability, and workers' compensation insurance, and a lower occupancy level results in a reduced insurance premium.

6. The system of claim 3, wherein at least one of the plurality of risk relationship sensors is associated with (i) a door sensor, (ii) a chair sensor, (iii) a floor sensor, (iv) an elevator sensor, (v) a motion detector, (vi) a wireless network utilization sensor, and (vii) a WiFi utilization sensor.

7. The system of claim 2, wherein the transmitted indication of the result of the analysis is associated with an equipment use characterization.

8. The system of claim 2, wherein the transmitted indication of the result of the analysis is associated with a site space characterization.

9. The system of claim 2, wherein the transmitted indication of the result of the analysis is associated with an employee behavior characterization.

10. The system of claim 1, wherein different risk relationship sensors sense different environment characteristics, including at least three of: (i) moisture, (ii) water flowing through a pipe, (iii) a temperature, (iv) a thermal image, (v) mold, (vi) an image captured by a camera, (vii) video streamed from a camera, (viii) audio information detected by a microphone, (ix) a water flow volume or rate determined by a smart a risk relationship meter, (x) an alarm system, and (xi) a smoke detector.

11. The system of claim 1, further comprising:
an on-site a risk relationship information hub to: (i) receive data from the plurality of risk relationship sensors via the communication network, and (ii) transmit indications associated with the received data via another communication network.

12. The system of claim 11, wherein the communication network is a wireless communication network and the other communication network is the Internet.

13. The system of claim 11, wherein the enterprise analytics platform is associated with a cloud-based computing architecture.

14. The system of claim 13, wherein the predictive analytics algorithm is associated with at least one of: (i) cognitive learning, (ii) pattern recognition, (iii) an early detection algorithm, (iv) a risk analysis, and (v) a risk score.

15. The system of claim 13, wherein the indication transmitted by the enterprise analytics platform comprises an electronic alert signal.

16. The system of claim 15, wherein the electronic alert signal is associated with at least one of: (i) an automated telephone call, (ii) an email message, and (iii) a text message.

17. The system of claim 16, wherein the electronic alert signal includes a potential cause of a risk relationship event and a recommended remedial action.

18. The system of claim 1, wherein at least one of the power sources is associated with at least one of: (i) a battery, (ii) a re-chargeable battery, and (iii) an Alternating Current ("AC") power adapter.

19. The system of claim 1, wherein the result of the analysis is to be used to calculate an event damage rating for an enterprise associated with the site.

20. The system of claim 19, wherein the event damage rating is associated with at least one of: an insurance premium adjustment, a deductible value, a co-payment, an insurance policy endorsement, and an insurance limit value.

21. A computerized method associated with a site, comprising:
collecting, from a plurality of risk relationship sensors, data associated with a risk relationship at the site via communication network, wherein each risk relationship sensor includes: (i) an environment characteristic detection element to sense an environment characteristic, (ii) a power source, and (iii) a communication device, coupled to the environment characteristic detection element and the power source, to transmit the data associated with a risk relationship;
storing, in a risk relationship data store, electronic records associated with prior risk relationship events at other sites along with risk relationship sensor location data for those sites;
automatically analyzing, by a computer processor of an enterprise analytics platform, the electronic records in the risk relationship data store to create a predictive analytics algorithm;
automatically analyzing, by the computer processor of the enterprise analytics platform in substantially real-time, the data associated with a risk relationship at the site using the predictive analytics algorithm; and
transmitting, from the enterprise analytics platform, an indication of a result of the analysis, the result including a map showing all of: 1. fixed risk relationship sensor locations, and 2. areas signifying particular levels of potential damage, wherein potential damage is the capacity for future damage and the particular levels are related to a cost of the potential damage.

22. The method of claim 21, wherein the plurality of risk relationship sensors include at least one image capturing sensor comprising: (i) a camera, (ii) a video camera, or (iii) an infrared camera.

23. The method of claim 22, wherein the data from the at least one image capturing sensor is used to estimate an occupancy.

* * * * *